(12) United States Patent
Pryor

(10) Patent No.: US 8,665,245 B2
(45) Date of Patent: *Mar. 4, 2014

(54) RECONFIGURABLE TACTILE CONTROLS AND DISPLAYS

(76) Inventor: Timothy R. Pryor, Windsor (CA)

(*) Notice: Subject to any disclaimer, the term of this patent is extended or adjusted under 35 U.S.C. 154(b) by 886 days.

This patent is subject to a terminal disclaimer.

(21) Appl. No.: 12/715,097

(22) Filed: Mar. 1, 2010

(65) Prior Publication Data

US 2010/0201893 A1 Aug. 12, 2010

Related U.S. Application Data

(60) Division of application No. 11/319,807, filed on Dec. 29, 2005, now Pat. No. 7,671,851, which is a continuation-in-part of application No. 11/184,076, filed on Jul. 19, 2005, now Pat. No. 7,466,843, and a continuation-in-part of application No. 11/045,131, filed on Jan. 31, 2005, now abandoned, and a continuation-in-part of application No. 09/789,538, filed on Feb. 22, 2001, now Pat. No. 7,084,859, and a continuation-in-part of application No. 10/611,814, filed on Jul. 2, 2003, now Pat. No. 7,489,303, and a continuation-in-part of application No. 10/934,762, filed on Sep. 7, 2004, now Pat. No. 8,287,374.

(60) Provisional application No. 60/639,799, filed on Dec. 29, 2004, provisional application No. 60/650,554, filed on Feb. 8, 2005.

(51) Int. Cl.
*G06F 3/033* (2013.01)
*G09G 5/00* (2006.01)

(52) U.S. Cl.
USPC ........................................... 345/184; 345/156

(58) Field of Classification Search
USPC .................. 345/158, 172, 173, 184; 382/103; 353/14; 348/734; 341/35
See application file for complete search history.

(56) References Cited

U.S. PATENT DOCUMENTS

| | | | |
|---|---|---|---|
| 5,983,057 A * | 11/1999 | Matsuo et al. ................ | 399/207 |
| 6,175,610 B1 * | 1/2001 | Peter ................................ | 378/8 |
| 7,212,318 B2 * | 5/2007 | Bradbery ...................... | 358/474 |
| 2002/0005888 A1 * | 1/2002 | Obata et al. ................... | 347/139 |
| 2005/0275664 A1 * | 12/2005 | Hobgood et al. ............. | 345/633 |

* cited by examiner

*Primary Examiner* — Ricardo L Osorio
(74) *Attorney, Agent, or Firm* — Warner Norcross & Judd LLP

(57) ABSTRACT

New methods and apparatus are provided for efficiently and safely providing controls and displays therefore, particularly, but necessarily to be used within the center stack region of a vehicle instrument panel. The apparatus utilizes, in most embodiments, a rear projection display and machine vision sensing of control position and, optionally, finger touch. A very stylistic and easy to use instrument panel results which can be programmed or otherwise provided in many different forms to suit different users or option package designs.

20 Claims, 34 Drawing Sheets

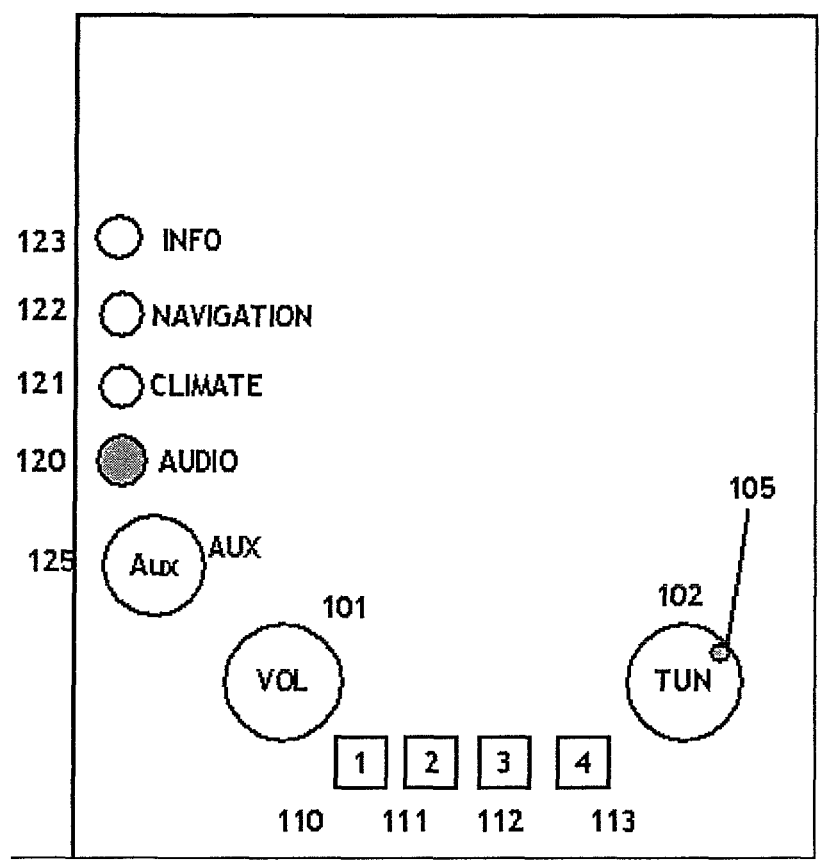

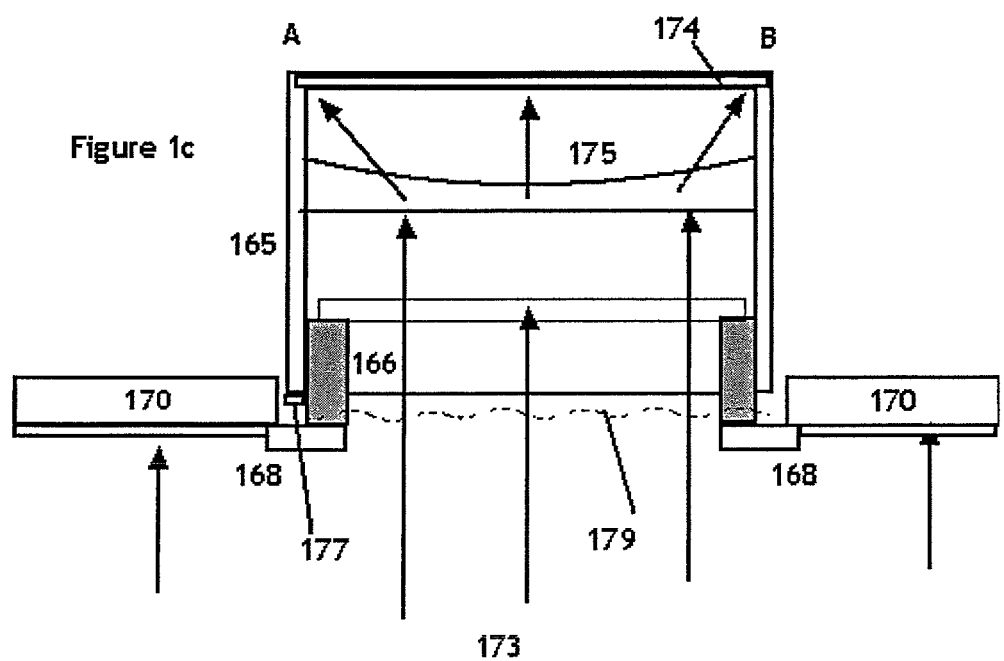

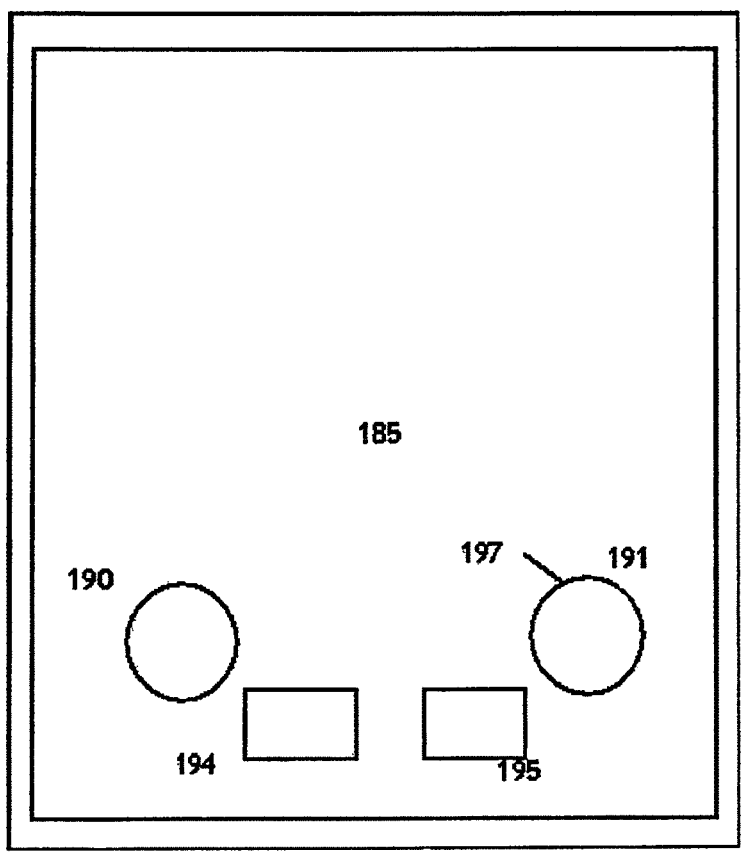

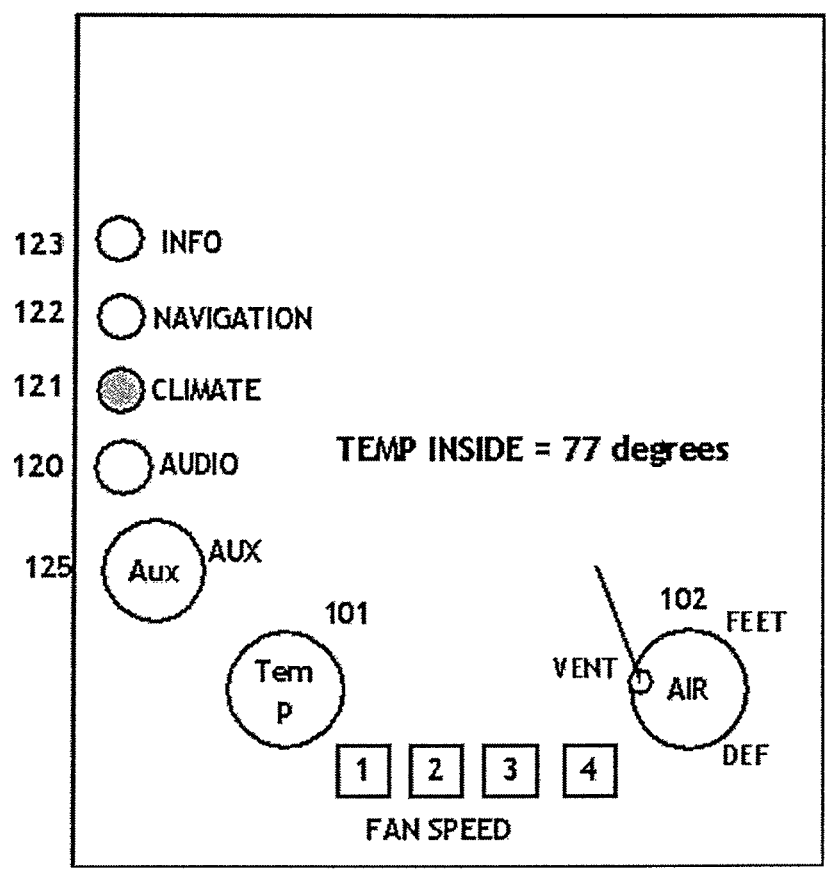

Figure 4
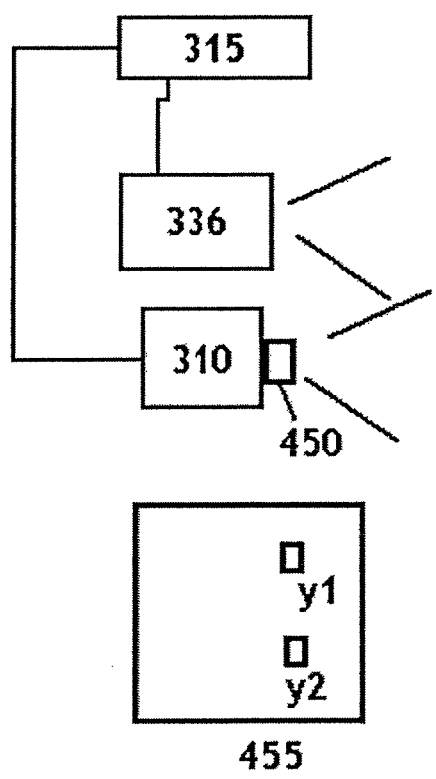
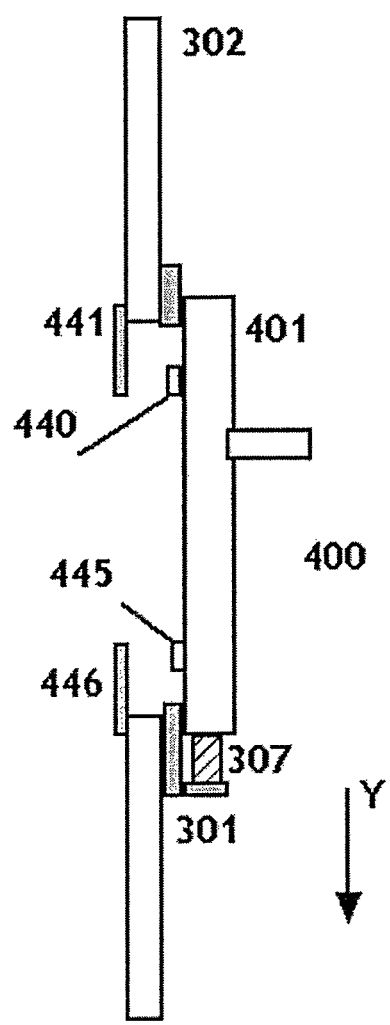

500

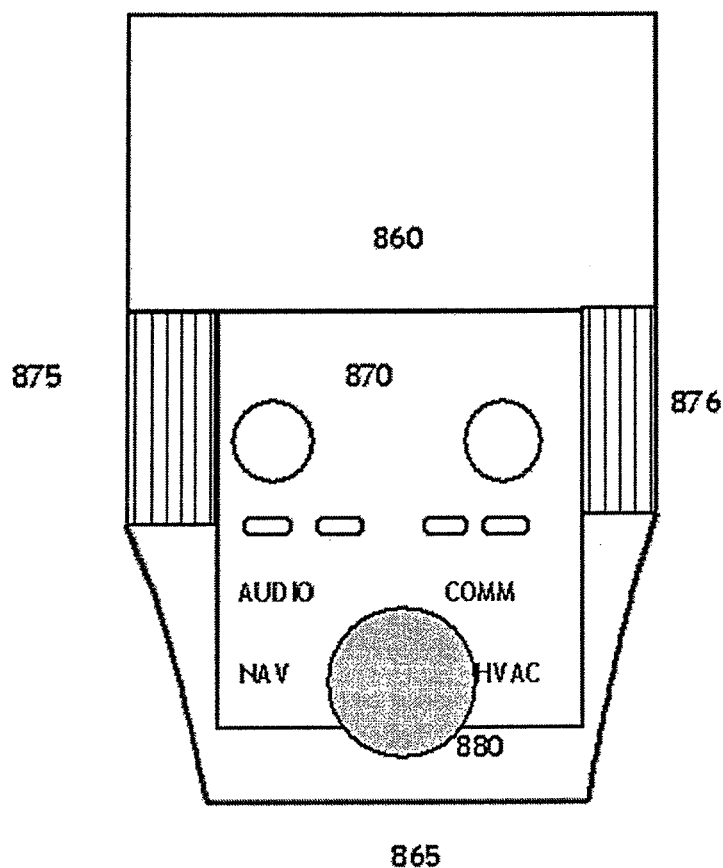

Figure 9b
top view
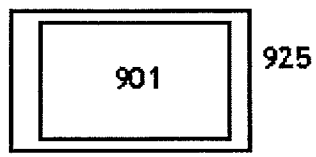
open     925                                         closed
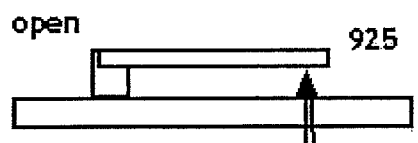        
reflected light comes back to camera from shiny back side of cantilever.        reflected light from member (or reflector on it) does not come back to camera
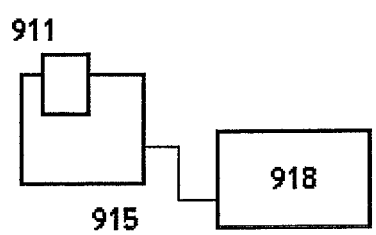

Figure 9d
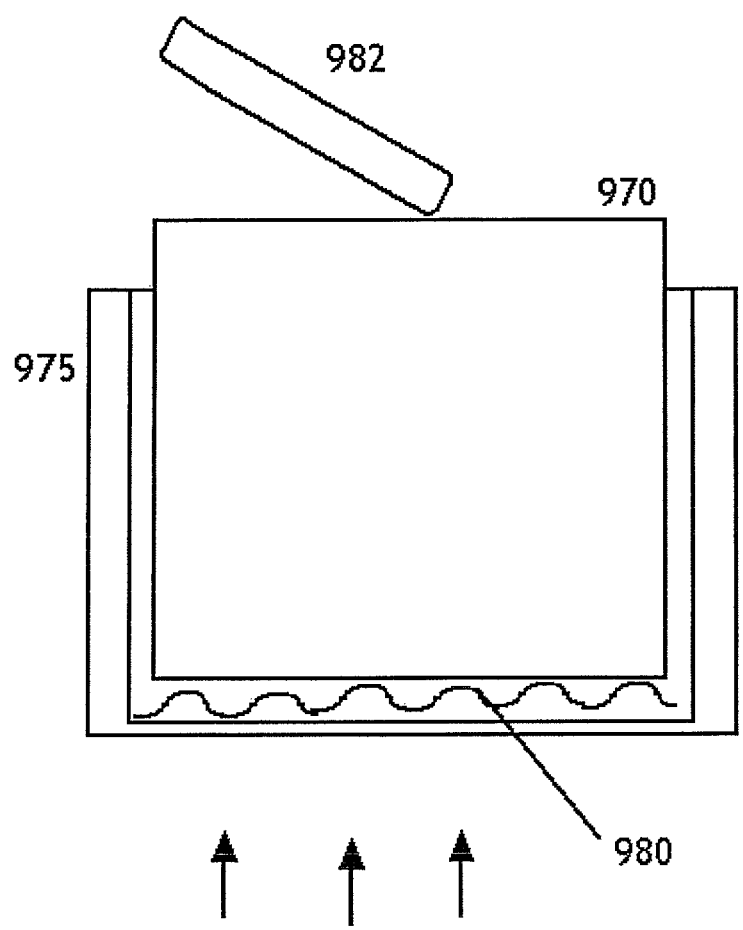
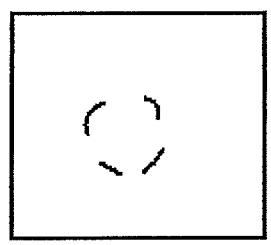
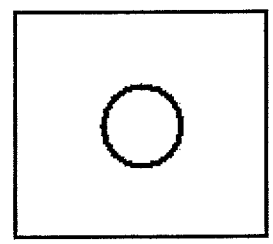

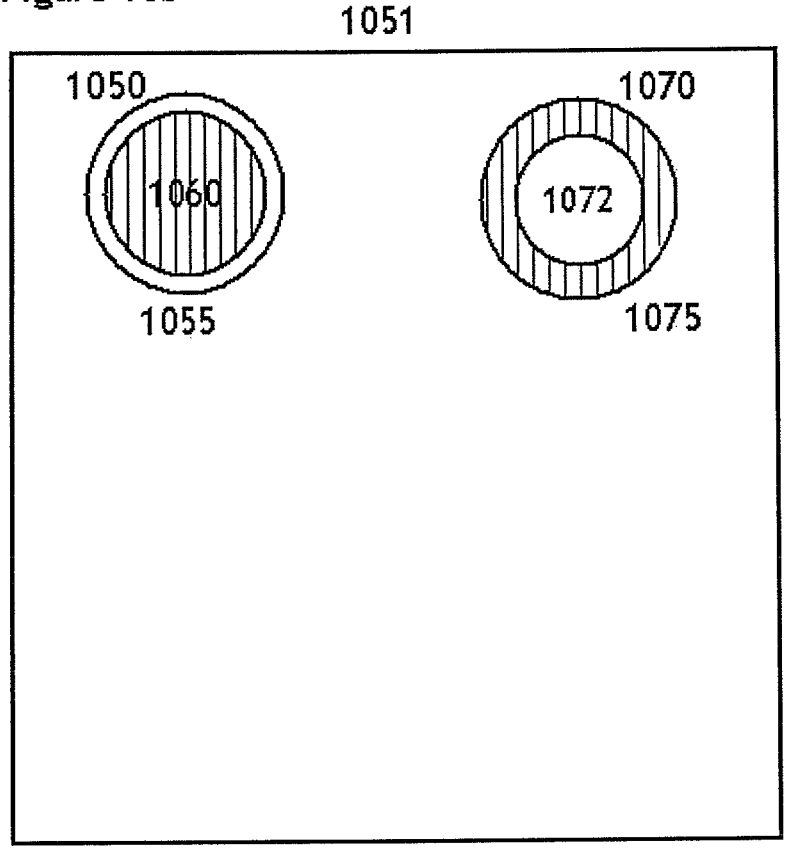

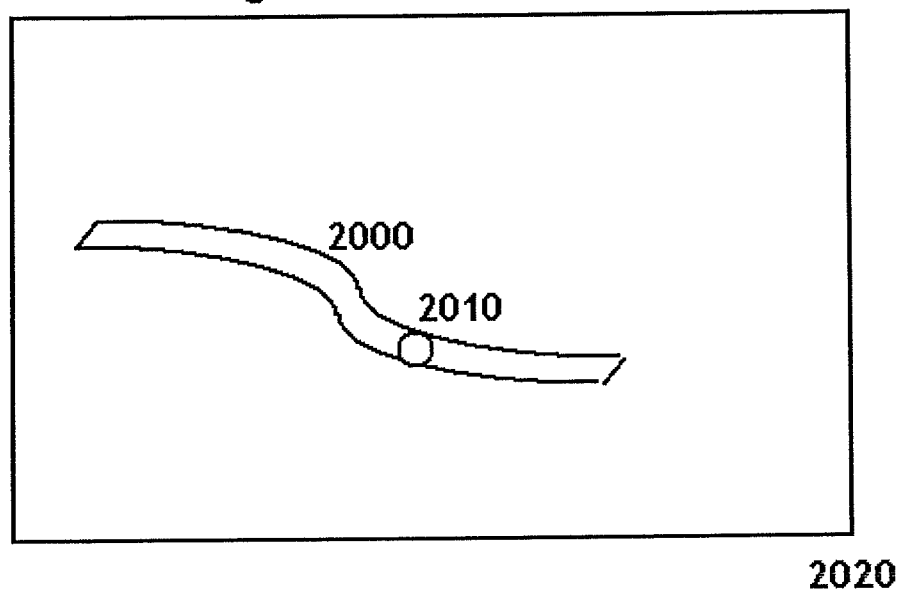
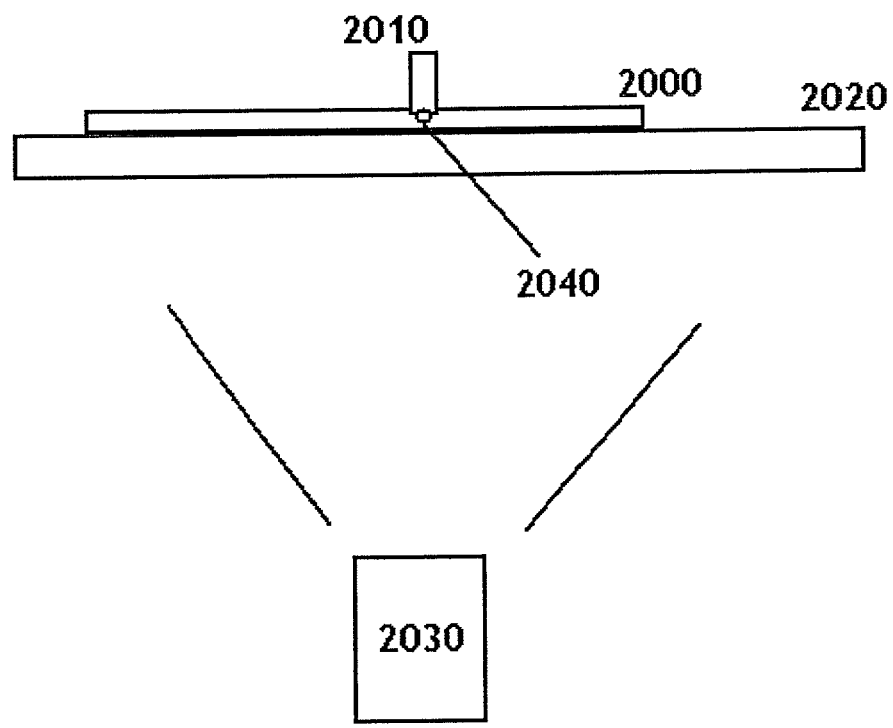
Figure 20

RECONFIGURABLE TACTILE CONTROLS AND DISPLAYS

CROSS REFERENCE TO RELATED APPLICATIONS

This application is a divisional of application Ser. No. 11/319,807, filed Dec. 29, 2005 now U.S. Pat. No. 7,671,851; which claims benefit of U.S. provisional applications No. 60/639,799, filed Dec. 29, 2004 and No. 60/650,554, filed Feb. 8, 2005.

This application is also a continuation-in-part of Ser. No. 11/184,076, filed on Jul. 19, 2005 now U.S. Pat. No. 7,466,843, entitled Multi-functional Control and Entertainment Systems.

This application is also a continuation-in-part of Ser. No. 11/045,131, filed on Jan. 31, 2005 now abandoned, entitled Reconfigurable tactile control displays for automobile instrument panels and other applications.

This application is also a continuation-in-part of Ser. No. 09/789,538 filed Feb. 22, 2001 now U.S. Pat. No. 7,084,859 entitled Programmable Tactile touch Screen Displays and Man machine Interfaces for Improved Vehicle Instrumentation and Telematics.

This application is also a continuation-in-part of Ser. No. 10/611,814 filed Jul. 2, 2003 now U.S. Pat. No. 7,489,303 entitled Reconfigurable Instrument Panels.

This application is also a continuation-in-part of Ser. No. 10/934,762 filed Sep. 7, 2004 now U.S. Pat. No. 8,287,374 entitled Reconfigurable Control Displays For Games, Toys, And Other Applications.

CROSS REFERENCES TO RELATED CO-PENDING APPLICATIONS BY THE INVENTOR

1. Touch TV and other Man Machine Interfaces (Ser. No. 09/435,854 which was a continuation of application Ser. No. 07/946,908, now U.S. Pat. No. 5,982,352).
2. Useful Man Machine interfaces and application Ser. No. 09/138,339.
3. Ser. No. 09/789,538 entitled Programmable Tactile touch Screen Displays and Man machine Interfaces for Improved Vehicle Instrumentation and Telematics.
4. Ser. No. 10/611,814 filed Jul. 2, 2003.
5. PCT/US2004/09701 filed Mar. 31, 2004, entitled Reconfigurable Vehicle Instrument Panels.
6. Ser. No. 09/612,225 entitled Camera Based Man Machine Interfaces.
7. U.S. Ser. No. 10/934,762 filed Sep. 7, 2004 entitled "Reconfigurable Control Displays For Games, Toys, And Other Applications".
8. U.S. Ser. No. 10/611,814 filed Jul. 2, 2003; and U.S. Ser. No. 09/789,538 filed Feb. 22, 2001 entitled "Programmable Tactile Touch Screen Displays and Man-Machine Interfaces for Improved Vehicle Instrumentation and Telematics."

The disclosures of the above patents and co-pending patent applications by the inventor are incorporated herein by reference.

FIELD OF THE INVENTION

The invention herein primarily concerns control panels, and in particular those in a Vehicle Instrument Panel (also called an "IP", and in some cases a dashboard, or dash panel or dash), based on what I call a "Reconfigurable Tactile Control Display" (or RTD for short) to provide a wide range of information, and the safe input of data to a computer controlling the vehicle sub-systems, while at the same time aesthetically pleasing.

BACKGROUND OF THE INVENTION

Prior art and other information relating to the general background of this invention is described in my co-pending applications to which this application is a continuation in part and which have been incorporated by reference.

SUMMARY OF THE INVENTION

The invention disclosed in or at least related to in most of the embodiments herein, is a new form of control panel, or instrument panel depending on the terminology one wishes to use. I call it the RTD, and it has been the subject of several co-pending applications. Typically it has both a display portion and a control portion, the later comprising knobs, switches, sliders or other physical controls. I call the display portion in many cases a screen, as an associated rear projection system is most often used to display the information. And the control portion, I often refer to as a control surface. Some embodiments also include novel touch sensing means, generally used in combination with the physical controls. In this case the control surface can also include the touch sensitive portion of the display screen, on which the virtual controls can be projected, and touch sensed to indicate a control command desired.

Sensing of the control is in many embodiments provided in a novel manner using machine vision, and is effective in reducing the cost and complexity of controls, even when no display function is provided at all. However, since the vision is non-contact, it can co-exist easily with a rear projection display arrangement as has been disclosed.

The RTD invention has many advantages as has been described in the co-pending applications. This is particularly true in automobiles, as the RTD maximizes available display space and control space within the confines of instrument panel "real estate", which in general is limited to the region of the instrument panel between the two front seat passengers, which is also called the "center stack". It does so by providing reconfigurable controls, both physical and virtual. This allows it to provide many features I feel are important for elderly drivers and the general populace as a whole, providing both increased functionality and safety, at low cost.

Cars today generally employ knobs and switches used by the driver or passenger to control functions for the vehicle. The center stack of most vehicles has this now, for the Climate control (HVAC) and Audio sections, and to control auxiliary functions. If my RTD invention is to become widely accepted, it is logical that it have these controls at a minimum, plus touch sensing, or menu selection, or other capability as needed (and if needed) to access functions for premium vehicles, or to provide feature options to low line vehicles.

The invention allows one to see information directly displayed on the switch, knob or slider face, or a variation thereof. And when projection of a large image is needed, such as a map or backing up, it can be projected right thru the control device. While some interruption of the image takes place at the boundaries of the device, the resultant somewhat interrupted image is still useful for many purposes, such as basic understanding of object presence and location behind a vehicle.

Both switches and knobs have been shown in my previous applications; for example in my recent regular U.S.A application Ser. No. 10/934,762 and the earlier Ser. No. 10/611, 814, as well as my currently pending PCT application.

I believe that I am the first to propose the provision of HVAC (Climate) and Audio sections of the vehicle operated by reconfigurable knobs and reconfigurable switches, often the same, or substantially the same devices. It should also be noted that a combination of any two of knobs sliders and switches is also envisioned, as is the use of all three control devices, with most if not all also being reconfigurable.

I have disclosed that there can be different graphics on the face of the knob switch or slider, as well as along side it, and in both cases allowing the same physical devices to be used for different functions (e.g. Radio, heater) which can be selected via selector knob or selector switches for example.

The significance of combination of reconfigurable knobs and physical switches is that it can provide all the functionality needed for almost all motorists, including those wishing numerous hi-tech functions such as navigation systems. I have found that one does not in general need infinite variability. In effect, and looked at another way, the reconfigurable knobs and switches and can be used as flexibly as reconfigurable touch screen icons, but with a familiar feel and function people are used to. And one can see through the devices as well if so constructed, so that one can have a larger displayed image presentation as will be shown herein. It is safer too because of the feel. And programmable tactile sensations can be added to them if needed.

This application introduces a further aspect of the invention, the use of a hybrid system employing both projection displays and conventional flat panel displays (FPDs) such as LCDs. The combination allows economical cost for large displays to be achieved in the near term, while also providing curved and irregular screens and control surfaces of stylistic interest. A useful concept is disclosed too for having a large combined display in which the FPD displayed image may be carried over to a rear projected display in an apparently seamless manner. Displays using light diffusing perforated plastic or woven materials are also possible with the projected display of the invention, which materials can also be used to provide air distribution into the passenger compartment of the vehicle or other location.

Also disclosed is a preferred arrangement in which conventional HVAC and auxiliary controls may be advantageously employed in combination with RTD based controls and displays, including the hybrid one just mentioned.

Further disclosed herein are preferred arrangements for optical sensing of knobs switches and sliders, also in the presence of bright sunlight in the vehicle.

Also disclosed are sensing devices for allowing persons in a vehicle or other location to control functions using their fingers to block or pass light from a reflector.

Disclosed as well are methods for coding instrument panels in colors and shades to enable more efficient and comfortable use by operators, and to provide more stylistic appearance, also including projection of decorative images or color fields on textured surfaces Further disclosed are methods for providing ventilation air to occupants through screens and switches, which also may display images.

In addition are disclosed various means to package projection displays and controls in the instrument panel of a vehicle and to provide magnification of images projected. Disclosed too are means for projection and imaging of data using a line scan light valve and rotary mirror, coupled with a line scan detector array.

Further features and advantages of the present invention will be set forth in, or apparent from, the detailed description of preferred embodiments thereof which follows.

BRIEF DESCRIPTION OF THE DRAWINGS

FIG. 1a illustrates a typical RTD type control surface shown in co pending applications FIG. 1c illustrates a knob with an inner journal FIG. 1d illustrates the ability of the invention to display very large images in the vehicle center stack or elsewhere FIG. 1e illustrates the control surface of FIG. 1a switched to a climate control presentation.

FIG. 4 illustrates a three position reflected intensity sensing switch embodiment of the invention sliding substantially in the plane of the screen/control surface

FIG. 9b illustrates a cantilever beam based switch of the invention.

FIG. 9d illustrates a circular pushbutton switch of the invention

FIG. 10b illustrates two knobs conducting air.

FIG. 20 illustrates a unique curvilinear slider control of the invention.

DESCRIPTION OF THE PREFERRED EMBODIMENTS

Figure 1B:
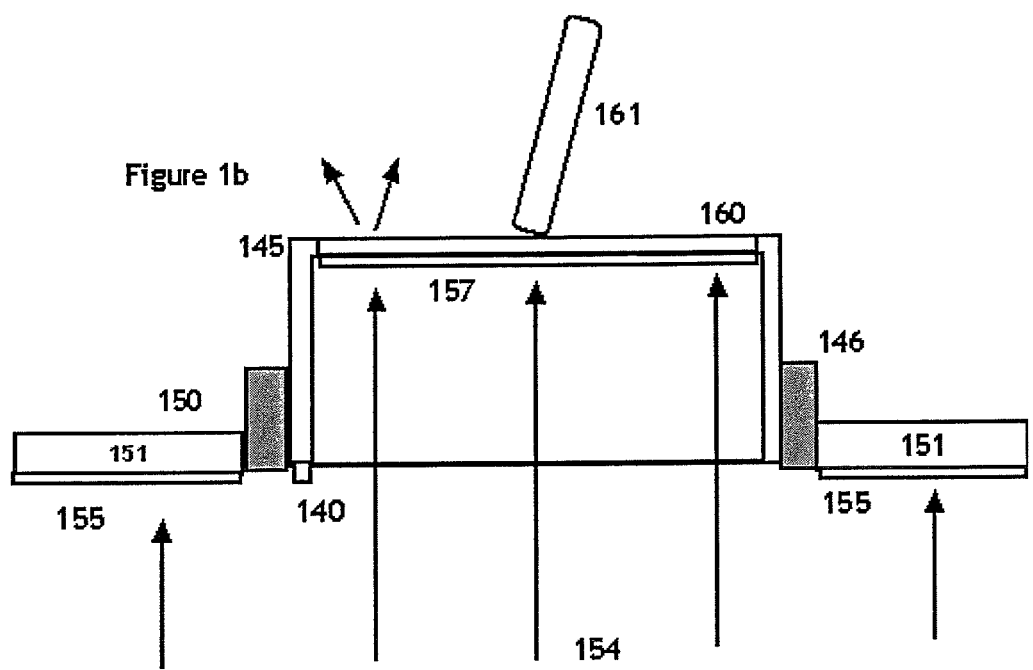
FIG. 1b illustrates further the design of a knob rotating within an outer bearing surface

FIG. 1a illustrates a typical control surface an RTD type shown in co-pending applications, in this case having two knobs 101 and 102 and 4 touch switches 110-113 for various functions, for example radio presets. The knobs might at one time be programmed to display VOL (for volume) and TUN (for tuning) of a radio, when the corresponding AUDIO switch 120 was pressed. At another time, they might represent temperature or fan speed when the CLIMATE selector switch 111 was pressed. The function of the controls can be changed by pressing one of the 4 (in this example) selector switches 120-123 together with the function of the auxiliary switch 125. For example, the knobs might at one time be programmed to display VOL (for volume) and TUNE (for tuning) of a radio, when the corresponding AUDIO switch 120 was activated. At another time, they might represent temperature or fan speed when the selector switch 121 for CLIMATE was pressed. While the switches can be virtual icon based as described in co-pending applications, in this example, they are physical switches that are depressed into the plane of the surface or slid along the plane of the surface at the switch location. The function of a switch or other control (such as a knob) can be projected next to it, such as the words Navigation, Audio, Climate etc shown. Alternatively or in addition, each of the switches and knobs may be provided with a clear center and a diffusing surface presenting the image, such as shown in the AUX switch 125. In addition, one can project images on the face of the knob or switch which can correspond better to what is intended than say some universal pictograph. Or you can project in any language desired. This is very useful where vehicles are sold in different places, or where one has a vehicle with different drivers. And the picture projected may be personalized on the control. For example, if a knob is used to select songs from a play list, the album cover for that song, or the singer's picture, may be displayed on the knob face to facilitate driver recognition of the song without reading written words.

FIG. 1b illustrates design of an exemplary knob such as 101. As shown a target 140, such as a retro reflector is observed by a camera (not to scale) 141 equipped with substantially on axis LED illuminator 142 and its position determined, in order to determine the rotational position of the knob. More than one target on the rotating portion of the knob 145 (which rotates within the outer journal 146 which is inset into a hole 150 in screen 151 and fixed there to) can be used for this purpose if desired, which typically improves accuracy of rotation detection. Alternatively, the knob may rotate about an inner journal bearing for example. Retaining means to affix the knob to the outer journal is not shown for clarity The screen is illuminated by a projected image information 154 which diffuses in this example from beaded diffusing screen material 155 which has been removed beneath the knob to allow projected light to pass thru the center of the knob and hit and diffuse from material 157 on clear disc knob face member 160.

It is desirable where possible that the target be seen by the camera in such a manner that light does not have to pass through the screen diffusive material 155, This allows a strong target signal to be seen, and the use of a retroreflective target 140. It should be noted that the journal 146 which is sunk into the screen, desirably blocks light from the projector which is coming through in the region where the Vikuiti or other diffusing material is not provided on the rear of the screen to allow passage to the knob face.

Projection of knob label or other information on the knob face 160 provides a very desirable advantage in that the labeling of the knob (or other control such as a switch) can be achieved by projecting the label right on its face, thus not using up the space around the device for this purpose.

It should be noted that icons, graphics or other information presented on screen knob face 160 can also be touched, for example by users finger 161, and this touch sensed by camera (or other electro-optical sensor) 141 as previously disclosed in copending applications. Thus a knob (or switch or other control of this sort can also serve as a miniature touch screen. If desired this function could be provided by more conventional means, also including sensing force on the knob, or on the control surface containing the knob, as previously disclosed.

FIG. 1c illustrates a knob 165 rotating around an opaque inner journal 166, which is fastened to a ring member 168, itself fastened by adhesive or other means to screen and control surface 170. Retaining means to affix the knob to the inner journal is not shown for clarity. Diffusing material such as Vikuiti to diffuse projected light 173 is provided on face member 174 and screen member 170 as in FIG. 1b. Ring member 168 is made of a Rohm and Haas brand plastic which is substantially opaque in the visible, but transmits well at the 880 nm wavelength used in order to allow one or more reflective targets 177 on the back of the knob to be seen by the camera (or other electro-optical sensor) in such illumination. Provision of the lower ring member stops the visible projection light from leaking through the screen bothering the user.

Also illustrated in FIG. 1c is the optional use of a diverging fresnel (or other) lens 175 inside the knob in order to spread the projected image 173 to the edges A and B of the knob face member 174, which has beaded film or other diffusing material thereon. This allows the maximum projection area on face member 174. And it allows one to project whole images on the screen even in the presence of knobs, since projected sections of an image can be modified in the computer controlling image projection, so as to be correct size when expanded by the diverging lens 175, substantially and effectively avoiding the obstruction of the image projected due to the components such as bearings and the like of the knob. The same holds true for switches such as shown in figures below, which also may be similarly equipped to diverge light to their face members.

The arrangement of FIG. 1 maximizes the size of images which can be displayed on the screen/control surface including the knobs and switches. It allows the projections of complete large scale images on a large portion of the screen/ control surface wherein only segments go through each knob or switch, but the conglomerated whole looks like an over all large image. FIG. 1d illustrates the ability of the invention to display very large images in the vehicle center stack or elsewhere. An image obtained by a rear view camera or a stored map image 185 is displayed on screen and control surface 186 which includes knobs 190 and 191 and switches 194 and 195. Each knob and switch itself can display its portion of the image. While the edge regions such as 197 for example relative to knob 191 where the control meets the surface are typically obscured, the over all effect of the huge (by car standards) and largely uninterrupted display is preserved and is very useful and dramatic in its presentation. The labels such as VOL or TUN provided for knobs in normal operation would for example be eliminated in a back up mode when just rear views are desired.

There are many possible arrangements of controls of the FIG. 1 example. For example, The whole control surface can be dedicated to climate control functions as shown in FIG. 1e, by pushing climate button 121

Figure 1F:
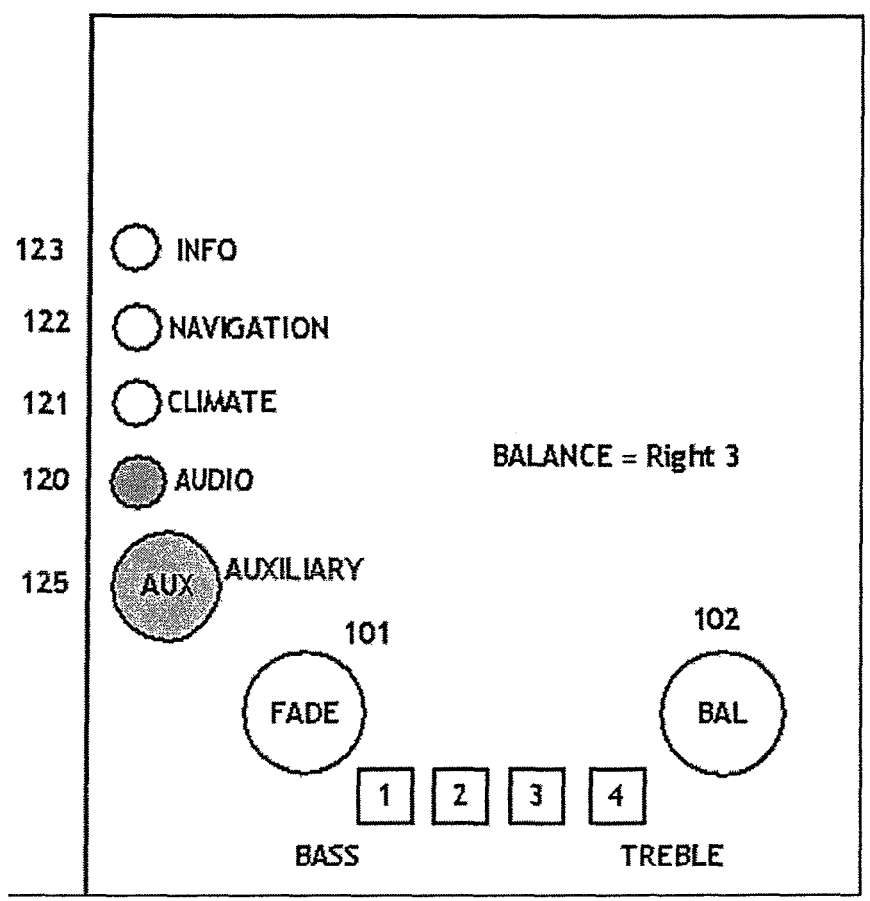
FIG. 1f illustrates the control surface of FIG. 1a switched to a Audio system sub function.

In another example, shown in FIG. 1f, pressing the AUX button 125, in addition to one of the function selector switches (E.g. AUDIO Switch 120), may cause a related sub function to be activated. Typically this would be just to set something, like Speaker Fade or Balance (which value can be displayed on the screen, for example as shown), or a Tone Control such as bass value. These could be individually displayed as Speaker and Tone screens (for example by pushing the AUX button a second time the Tone screen would come up) or both together as shown. Then in a preferred mode, after a time delay the screen would default back to the main function selected (e.g. audio system). A control surface with two extra knobs above the radio can alternatively be provided for example too.

The value to which a knob points can be programmably varied when one switches screens, even though the knob physically is in the same place—an important advantage. For example the right knob 102 has its pointer 105 displayed at the 2 O'clock position in the AUDIO screen of FIG. 1a, but in the 9 O'clock position in the Climate screen of FIG. 1e. This is because as the user changes screens from AUDIO to CLIMATE, the current climate position for that control is displayed, which in this case is in the Vent position due to a previous move by the user, or some automatic function which might be operating.

I would like now to disclose further details on the improved switch design described above, which is based on the slider in FIG. 10 of my '762 application. In this case the switching action, like that of knob 101 and 102, is in the plane of the screen and control surface, rather than be pushed into the screen like a push button switch. The change in position or light change caused by the switch movement by the user is detected by a TV camera as before, and analyzed by a computer which generates suitable control commands to the device controlled, and suitable graphics display commands to cause appropriate labels or data or other information to be displayed to the user. Because it is all computer controlled, a switch of this type can serve different functions at different times, and hence is reconfigurable, or multifunctional.

This switch design makes it easier to seal the screen and protect the optics behind, as all movement is in the plane of the screen and can be seen looking through the screen, without necessarily cutting a hole in the screen, though one can do this if desired as shown in the referenced patent applications.

It should be noted that a big diameter knob allows two beneficial things. It allows more data to be displayed in its center in a visible manner, and it allows a bigger device to grasp. The invention makes all of this possible by having the labeling on the knob rather than around it, and in addition, by reconfiguration allows more space to make the knobs of bigger diameter in a confined center stack space. One can have knobs or sliders with detents or continuous motion.

As pointed out in my co pending application filed in September 2004 of which this application is a continuation in part, a dual knob with an outer and inner ring can be used. This allows more ability to control various variables, with out adding switches or further knobs. For example when you turn the outer ring (lets say that is a secondary function) the primary label in the center of the knob can change to the secondary function, and then after the control move is accomplished default back to the primary label. Labels can be written text, but they can be pictures or even dynamic video images. These images could be chosen to be examples of what makes you like operate the device for example. Really personalized, in other words. Note that one can have an appropriate label on the knob face or labeling next to device or both, if desired. As noted, these labels can if desired be in different languages, or in more definition, or more detail or some other aspect.

Switches and knobs such as those disclosed above may not only have reconfigurable text or graphics displayed but also reconfigurable display simple colors or patterns in a decorative sense, or to provide increased user understanding of the controls. I would now like to discuss the use of colors or patterns to code, in the simplest case, one of switches could be a matching color to a related knob function. This color can be projected and can be thus changed programmably to relate at a further time to another control device as desired. This color-coding is programmable and can be done for various reasons and at various times, in various ways to aid operation of the controls. This is particularly valuable with inexperienced users, such as senior citizens or others who might be confused by a multiplicity of functions in a control panel. Even for technically astute operators, the color codes allow faster reaction times.

Figure 2:
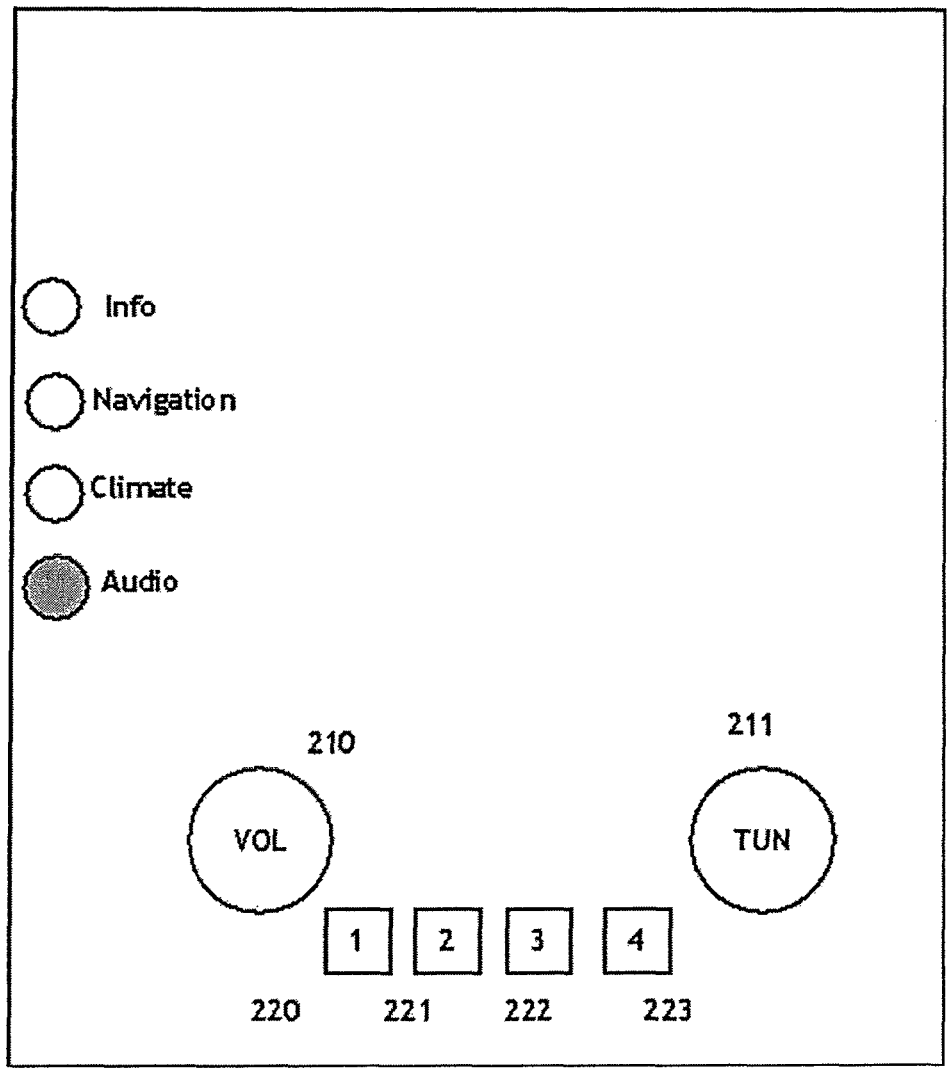
FIG. 2 illustrates a layout of the center stack of an instrument panel of the invention in which the controls are color coded to enable easier operation or other advantages.

FIG. 2 illustrates a layout of the center stack 200 of an instrument panel of the invention in which 6 of the controls on the control surface have been color coded by a program in the computer controlling the projector (or other display), to enable easier operation or other advantages. The computer and projector are not shown for clarity. This color-coding is programmable and can be done for various reasons and at various times, in various ways. In the particular case shown, the shaded controls (two knobs 210 and 211 and four switches 230 and 231 are colored the same color, for example red, as being part of a family of controls used to adjust let us say the sound quality of the audio system. Other combinations of colors can be chosen for different controls and functions. The color designation can even, if desired, be user selected via program choices on a pc, and downloaded to the vehicle for example. Since many of the controls may be programmed to serve multiple purposes (for example an Audio Volume knob one moment, and a Heater Temperature knob at another time) such color-coding is really very useful. For example, the knobs 210 and 211 when used for a Climate control function might be coded yellow, along with say three but not all four of the switches 220 and 223. Indeed the other switch if not used at all, might have black projected (i.e., no light) such that it became much less visible in the Climate mode.

For those operators such as the inventor who are red-green color blind, it is possible through just a program change to provide them with a meaningful color palette they can see, for examples bright blues and yellows rather than the typical green and red often chosen.

In addition or as alternative to color coding, it is also possible to programmably can turn on and off various illumination features to a device. For example, when first put in radio mode, one can choose to have only radio related buttons light up on the center stack, making it easy to see which ones mattered to the instant task at hand. The other buttons could be dark, or at lower illumination in this case. And the desired buttons may be color coded too. When the task was finished (noted by the movement to another control function for example) or after a time period had elapsed, the display can be programmed to simply revert to a standard color and display mode.

In addition, one can have different areas displayed. For example using the invention, one could black out those areas of the screen not needed for example to tune the radio. Or one may display a box around those controls needed, or cause the region to be shaded or any other technique making it easier for the driver or operator to see what to do.

For example too, one can push a button to work the bass controls of the audio system then use knob to control a big display of bass values (e.g., +2). Or could use three position button to go up or down. Functionally too, If a knob is changed in its function to a radio volume control, then all the switches might in one mode, turn to functions relating to that control Now disclosed are switches according to the invention which also allow projection of data in their center portions. To make the switch work optically, one can detect a specified movement of the switch (e.g. a one mm movement in the plane of the screen) relative to previous position, or a fixed home position, as disclosed in FIG. 3. Alternatively, one can upon moving the switch expose or cover up a reflector or other light indication which condition is detected, for example by a TV camera. This effectively determines that amount of light above a preset amount is present (or not present) in a given location, indicative of switch condition and is discussed further in FIG. 4 below. This condition is due to a detected light increase due to the exposure of a reflector to light (or other light source) by the action of moving the switch.

Figure 3:
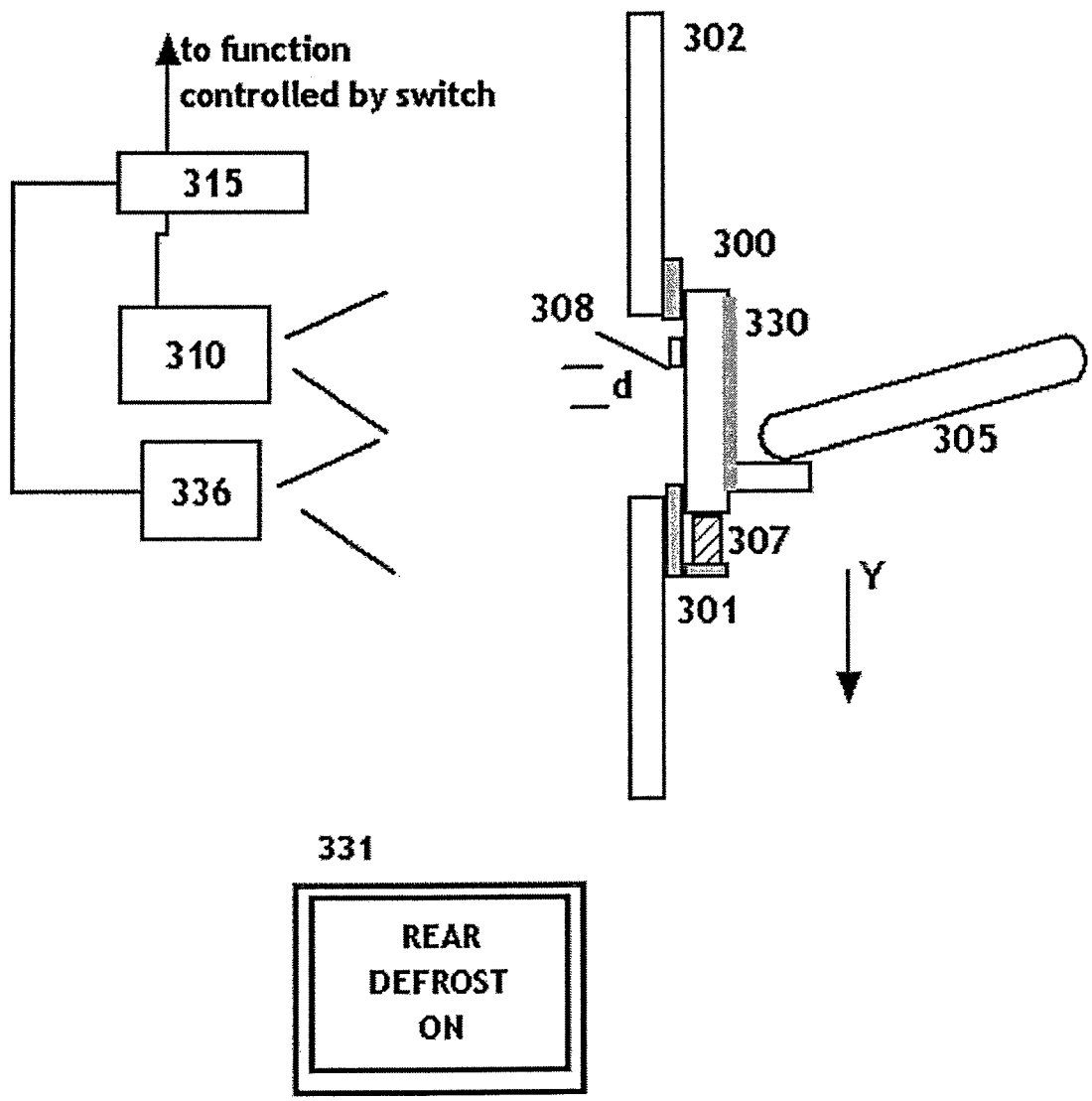
FIG. 3 illustrates a two position movement sensing switch embodiment of the invention sliding substantially in the plane of the screen/control surface

FIG. 3 illustrates an improved switch design sliding substantially in the plane of the screen/control surface whose switching action is accomplished by determining target movement or by exposing or masking one or more detected target datums. As shown, switch 300 moves in track 301 in the plane of the screen/control surface 302 by the action of the users finger 305 pressing the switch in the Y direction, which is typically in the downward direction in the vehicle, but doesn't have to be. The switch 301 need only move a small amount 'd' in order to allow detect of the movement of target datum 308 (typically a retroreflector,) on the moving portion of the switch by the camera 310, (not to scale, and including auxiliary light source if used) with computer 315 analyzing the image and determining that there is desired a state change of the controlled function, which signal is outputted by the computer to the function in question, such as turning on a light for example. The amount of movement d can be user controlled to be what ever is desired, and multiple values of d for different functions can be used as well. For example for a movement of d1, a certain function can be determined to have been desired by an operator, while for d2 another function. In addition, as noted below the camera system can also determine the movement in two directions (up and down, in this case) with respect to a nominal zero position, if the mechanics of the switch permit such action.

In a preferred version the switch is spring loaded (e.g. by coil spring 307) to return to its initial position. One historic use of this would be a radio station preset button for example, which you would push in the direction in order to activate that function. Such a push would typically be downward in a car application. But could be in any direction on the plane of the screen and control surface on which the switch moves. An alternative pushbutton into the surface is described in other embodiments below.

As shown the switch 301, in a preferred embodiment able to reconfigurably change the switch function label, is provided with a transparent diffusive face member 330 which can comprise 3M Vikuiti beaded film, a ground surface or other diffusing material. Different types of plastic and arrangements of diffusive surfaces can be used for the switch, and buttons can be solid transparent material or hollow to pass light thru. The screen 302 itself may have diffusive material such as beaded Vikuiti film on its rear surface (such as 155 in FIG. 1b) but has no diffusion material behind the switch, so that only the face of the switch diffuses the projected radiation from projector 336 (not to scale).

A front view 331 is shown of the moving portion of the switch (less finger rest, if any), with the label "REAR DEFRAOST ON" programmably displayed on its face 330. At a later time, and for a different function, it might be chosen to display "TRACTION CONTROL ON" for example. The chose of label, its color, and language are all programmably variable to suit the manufacturer, user or application The spring member 307 urges the switch back to its zero position when the user releases his finger. The switch may be constrained by any suitable means for example by housing 308.

Switch 301 can also be a multi-position switch, which goes to two or more different positions, besides the zero position (usually an "off" position). The positions are usually in one direction each side of the zero position. In one mode of operation of a three-position switch (center off), for the same radio preset for example, one can push down to select the station and, can push up to set the station for example. This push down is convenient for more used functions.

As an alternative arrangement, one can have three position switch where both positions are used in a time based mode, like window lift, where the up position energizes the window lift motor to raise the window up for the time the switch is engaged, and pushing the switch down similarly moves it down. The same holds true for seat and mirror adjustments.

This is in this form like the slider previously disclosed in the referenced regular applications but in this case it returns to zero when you let off, rather than stays physically at the setting you left it at, in a manner that was recently described re FIG. 7 in my above referenced July 2005 application entitled Flat Panel Display Based Control Devices of which this is a continuation in part.

A portion of the housing of the switch may shadow the region around the reflector from incident sun light rays if any. It should be noted that rather than reflect projected light directly one can reroute light thru a switch or knob and cause it to be retransmitted back to the region of the camera so as to be seen thereby as a function of switch or knob position.

The switch just described operates by determining that a displacement has occurred, which displacement is determined to exceed a threshold amount, such as d above in order to determine a switch function.

The necessity to return exactly to a home position, or to exactly go to a contact closure type position to trip a switch such as a conventional switch is not required, though one can build the device to do this. The machine vision system simply can compare a determined starting position of the moving member, to a final position. Neither has to be precise, one only need specify a amount of movement needed (E.g. 1 mm) to trigger a switching action, which movement can be detected by processing the camera image or other means. This movement amount can even be varied for different functions. That is for example, in heater mode, to use a switch like this to select an air distribution condition such as heat on the feet, one might set the amount of movement at 2 mm, where as for use of the same switch in a radio mode as a station preset, it could be set at 1 mm. Or it could be used as a two-position switch for one function, and a three position one for another.

In a variant of the above, one can look for the location in the camera image of the bright spot indicative of a strong reflection caused by exposure of the reflector due to the motion of the switch which positions the reflector in this location. Conversely one can look for the lack of indication in another location. This is particularly useful in a three-position switch as will now described.

It is noted that best results are obtained when the reflector 308 can be seen directly by camera 310. However, it is also possible to see the reflector if the diffusing material such as 3M vikuity is between it and the camera. In this case, and with vikuiti, a retroreflective function doesn't work well, and simple reflection may be used.

Next illustrated is a 2 or 3 position switch of the type shown in FIG. 3, in which a reflector is either exposed, or masked by action of the switch, changing the optical signal seen by the camera or other electo-optical sensing device. Consider FIG. 4 wherein a reflector is exposed by action of moving the sliding member 401 so as to direct light to the camera of the invention in order to trip the switch. The apparatus of FIG. 4 can be operated as a three-position switch 400, using, for example a reflector such as 440 and 441 at each end respectively. As you push 401 down in the drawing from the zero position, 440 is exposed from behind mask 441, as you push it up, reflector 445 is exposed from behind mask 446, The two images produced by camera lens 450 appear at different locations y1 and y2 (corresponding to exposing of reflector 440 or 445 respectively) on camera image scanning matrix array chip 455 and thus the presence of a reflected signal at a given location tells whether the push was up or down. No presence, means the switch is at its zero position in this example.

Alternatively one can arrange the switch in an analogous manner where the reflectors are covered up on one side or the other (that is so as to be not exposed to light) due to the movement of the switch. The same sorts of processing can be used, in reverse to identify, which reflector, if any is obscured, and thus which switch direction is intended by the user. In this case the reflector on the side toward where motion is going, is the one to be obscured. At the zero position the both reflectors are seen to be present in this example, opposite to the previously described.

To determine that a switching action has been commanded by the user, the amount of light from the reflector can be compared to a preset value, or to a moving average value within an allowable band, which takes account degradation of certain factors such as light source, dirt on optics etc.

In another mode of operation, an image subtraction can be made in the general camera image, and then the subtracted values compared If this subtraction is performed every fraction of a second or more, the movement of the switch will show up immediately as a positive signal in the otherwise zero intensity subtracted image-assuming no other source of light enters the system, which can however occur in passing through bright sunlight areas.

The two position switch can be one which uses spring steel or another elastic material to give motion that returns to zero, and, if desired, stops against a fixed stop. Different types of springs and materials can be used, such as coil, leaf, or other springs. Alternatively, in those switch embodiments that actually monitor position s, one can utilize a switch, which only approximately returns to its initial position. This can be for example using a springy material such as rubber to hold the switch against the screen and control surface It is also possible to build a two-axis switch along the lines of FIG. 3 or 4 above in which the switch is movable in both the x and y axis by the users finger which movement is opposed by leaf springs or coil springs or other means which urge the switch back to a neutral zero position when finger pressure is removed. The movement in x or y is used to trip the switch as disclosed herein. The two-axis switch can be built to move only in one direction from zero or two directions from zero. Such a three-position switch (including the zero position) is useful in a car context for mirror or seat adjustments in two axes for example.

One advantageous arrangement is to have a group of 4 switches located on a display screen and control surface of the invention, at least two of the switches being two axis (x acting and y acting) types such that they can be used for the seat controls and mirror controls, while the remaining two, are single axis. This has significant implication for reducing the cost of instrumentation and controls in the vehicle interior axis switches are used for windows that only require an up down motion. Optionally these switches can be used for fader and balance controls of the radio, and other purposes as well. The switches desirably, but not necessarily, have clear centers with diffusing screens facing the user, which can be used with the projector of the invention to display the instant function, or other data as desired.

Figure 5:
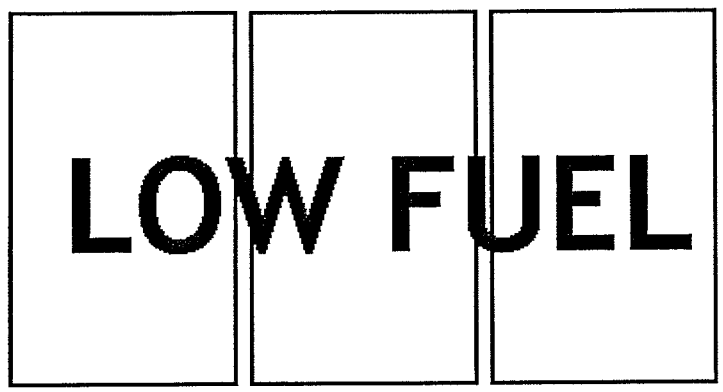
FIG. 5 illustrates a two-axis switch embodiment

The invention can project data onto a large number of controls, and the electro-optical sensing system (e.g. a camera and computer based machine vision software system) can sense a large number of controls effectively at once. FIG. 5 illustrates a simple row 500 of three switches of the type shown in 3 or 4 above, or the pushbutton types shown in the figures below. This row switch arrangement illustrates the use of the invention to provide projection of data across more than one switch face. These types of switches may be conveniently arranged in rows, and if desired side-by-side as shown. We note that in some cases the projected information can span more than one switch such as the words LOW FUEL shown (though typically each switch face would have projected on it the label for that switch, which could be alphanumeric, or a graphic). It is also noted that the methods disclosed herein can be used to make switches of this type have data projected right to their edge, which makes more pleasing images to cross the edges as well.

Figure 6A:
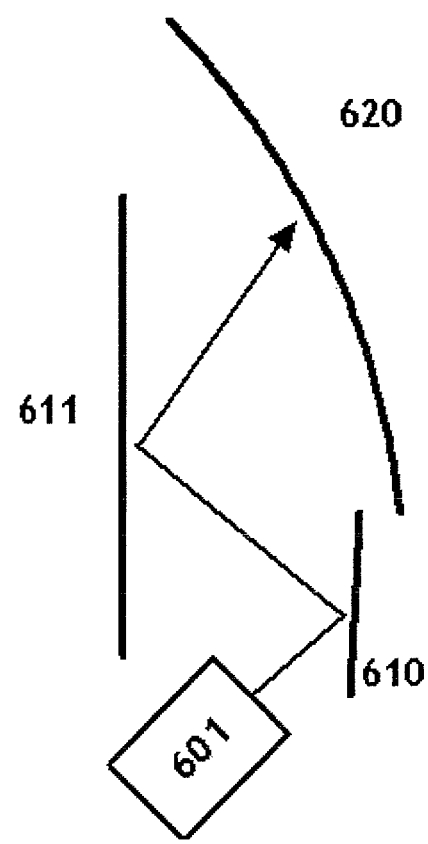
FIG. 6a illustrates projection using a mirror arrangement in a vehicle center stack.

FIG. 6 illustrates projection arrangements usable with various types of projectors such as LCD, DLP, LCOS and laser scanning types. FIG. 6a illustrates projection using a short focal length Mitsubishi DLP based "PocketProjector" 601 via a mirror arrangement consisting of mirrors 610 and 611, which also allows expansion of the image in the vertical direction onto screen and control surface 620. As resolution is typically quite acceptable at 800×600 pixel resolution over a 7×5.5 inch field (4:3 aspect ratio projector) this allows the vertical to also be 7 inches.

Figure 6B:
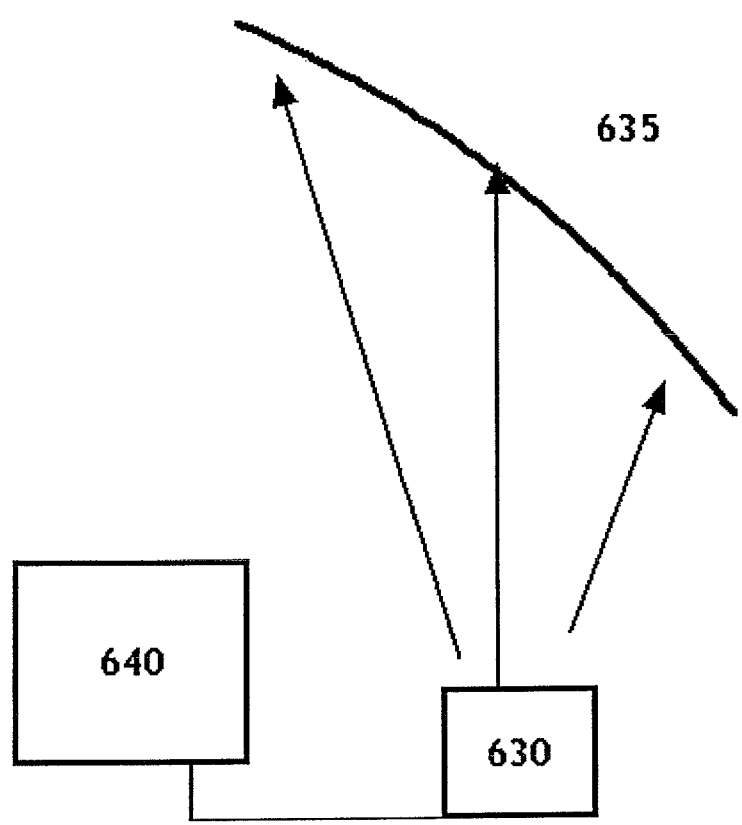
FIG. 6b illustrates another center stack projection arrangement

In example of FIG. 6b a suitable projector 630 is used to illuminate a screen surface directly shooting straight from the bottom of the vehicle on to a curved and angled screen 635. The DLP (or other image light valve) may be tilted with respect to the optical axis of the projector to allow all points on the screen to be more or less in focus, albeit with different magnifications. The magnification may be corrected to the degree necessary using the computer 640 used to drive the projector, which may project data modified such that when so projected, the projected image looks as desired. Even if computationally intensive, this is relatively straight forward, since dynamic video is not required, but rather relatively static control panel images which vary only infrequently in anything but a local region. Since the projector screen is tilted at a relatively shallow angle theta to the projection axis, the degree of magnification in the vertical direction is high, though no magnification occurs in the horizontal direction. In this case the long axis of the projector is in the vertical direction to allow higher resolutions to compensate for the spreading out of the pixels due to the angle of attack to the screen. If the angle is too great (for example, more than +/−40 degrees from the surface normal, 3M vikuti beaded material will not work well and other dispersion methods may be needed such as micro spheres within the screen, or lenticular screen surfaces, as examples. Curved mirror optics can also be used which can change the magnification in either direction.

Now disclosed is a method by which one can provide very large displays in a vehicle (or elsewhere) while still having a cost effective solution in the near term which is further more acceptably shallow in the depth direction "Z" (in the fore-aft direction of the vehicle, and perpendicular to the approximate plane of the screen and control surface). This method combines an existing LCD or other flat panel display (FPD) with a small projection display device, which is used to illuminate the portion having controls according to the invention. The FPD may or may not be optionally equipped with a touch screen known in the art, as desired.

Figure 7A:
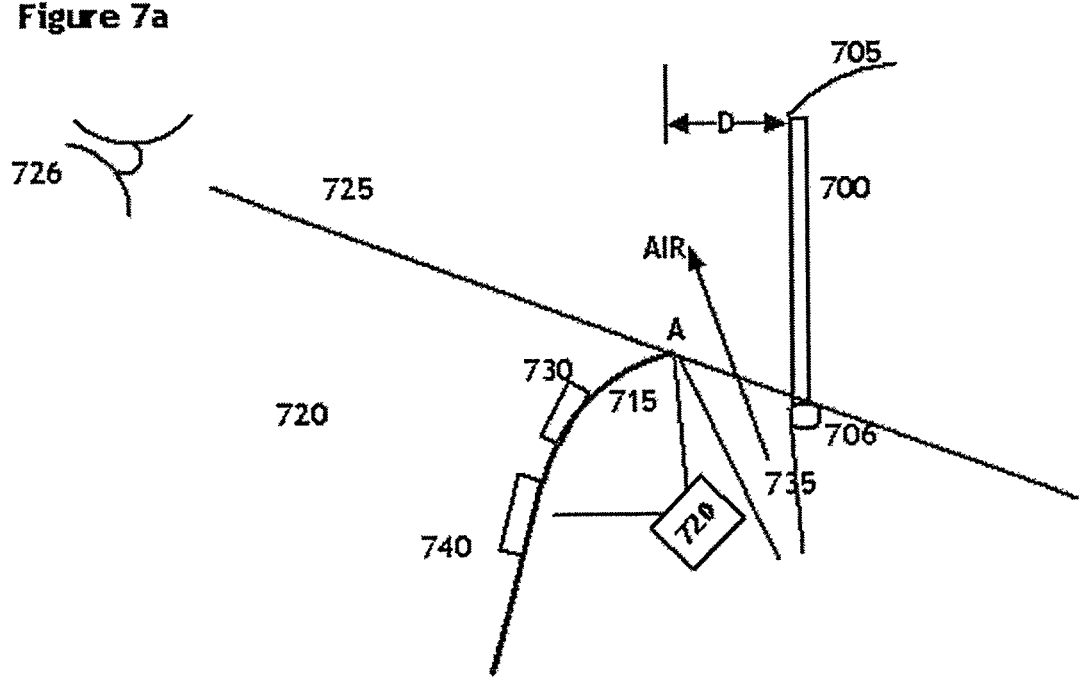
FIG. 7a illustrates a side view of a hybrid version of the invention
Figure 7B:
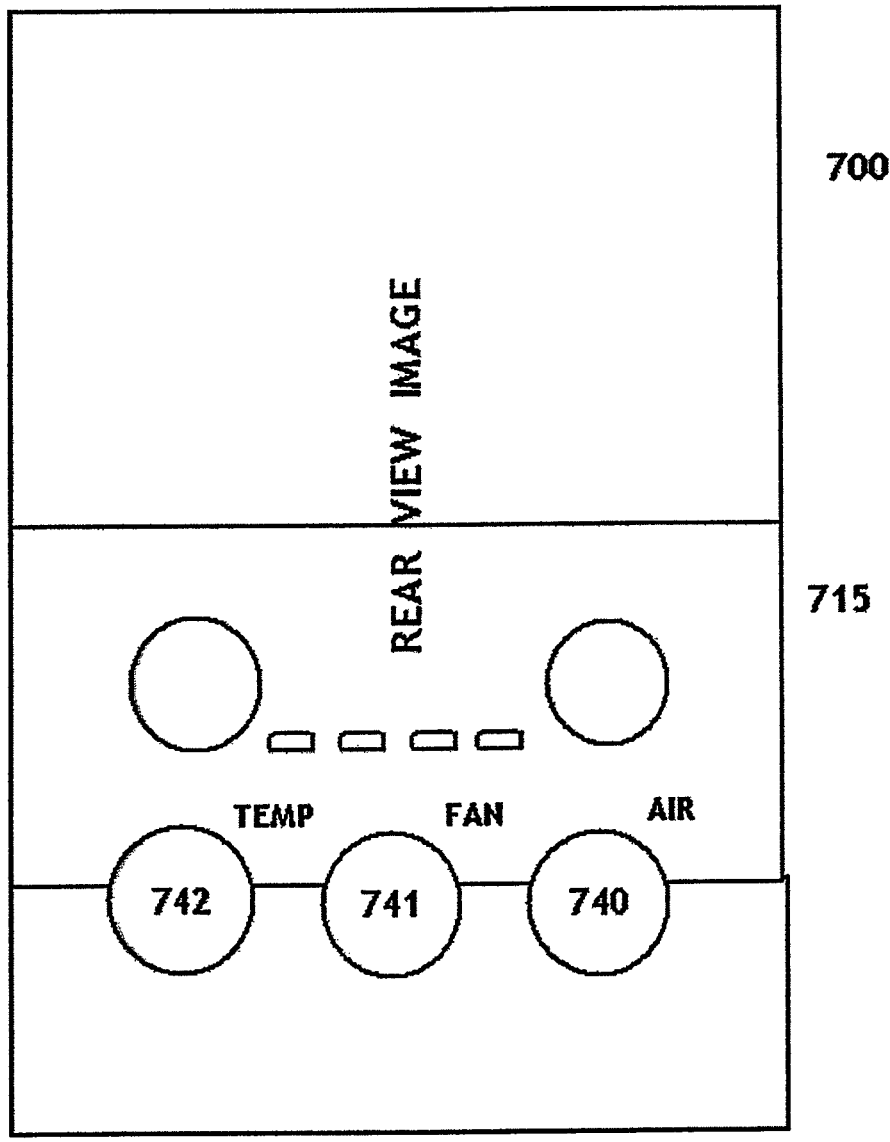
FIG. 7b illustrates a front view of the embodiment of FIG. 7a FIG. 8a illustrates another hybrid version of the invention

FIG. 7 illustrates a hybrid version of the invention disclosed briefly in my July 2005 co pending application comprising a programmable curvilinear display (e.g., rear projection, but possibly in the future an OLED or flexible LCD) an FPD and image stitching between the two displays. Also illustrate is an optional second FPD can be used on the other side of the projection display, and optional venting of air upwards in the region between the LCD and projection display. The embodiment is illustrated as follows in side view of FIG. 7a. An LCD display 700 is shown located in instrument panel center stack area 705. The LCD has a characteristic sealing border region 706 where no display results. Adjacent to, and in this case below, the LCD is a rear projection screen and control surface of the invention 715 which extends outward from the LCD into the passenger compartment of the vehicle 720. Because in this case the surface 715 is spaced a distance D, it is possible to project using projector 720 onto the surface at a top point A, which is substantially along the line of sight 725 of a driver 726 to the edge B of the effective display region at the bottom of the LCD. In this manner the display on the LCD and that on surface 715 are seen to effectively be continuous. To this end it is possible to project stitched images using video ram memory or other means, which effectively provide a display, which is contiguous across the two displays. This is helpful for large rear view camera displays or presentation of maps and the like. The RTD surface 715 also allows the placement of controls such as knobs 730 and switches as disclosed herein and in co pending applications. It is noted that the gap between the display surfaces 700 and 715 formed by distance D can be used to vent air to the passengers using a plenum such as 735 from the heating and ventilation system of the vehicle. The region D can be for example, covered over with air transmitting perforated plastic, woven materials, or adjustable direction vents FIG. 7b illustrates a front view, which shows a further feature, namely the wrap around of the RTD surface with conventional controls below such as conventional HVAC and other controls such as 740, 741 and 742 which may be desired, particularly if used to switch large currents such as rear defroster, seat motors, etc. This RTD display can be used to display information relative to these controls too, saving the need for special indicators for same. For example the labels of these controls can be provided on the RTD screen, such as those for knobs 740-742 shown. Or words such as REAR DEFROST ON, can be shown on the bottom of the RTD screen, as can other data indicative of the position of the controls, such as DEFROST, or FAN SPEED 5, etc. If the conventional controls are incorporated electronically into the RTD, this region below can be used for another LCD screen (see FIG. 8b), or even more conventional controls, or storage, or whatever is desired.

Note that light diffusing perforated plastic or woven materials can also act as a projected display screen surface for the invention, which materials can provide a stylistic effect, and may also be used to provide air distribution if desired into the passenger compartment of the vehicle or other location. Colors and patterns can be effectively projected onto woven materials which otherwise might not provide the resolution for high-resolution graphics such as text.

FIG. 8a is an alternative hybrid arrangement with a 16:9 aspect LCD display 860 on the top of the center stack 865, and a RTD screen/control surface 870 this time with the long axis vertical, allowing room for vents 875 and 876 on the sides. This version also illustrates the use of a joystick knob 880 (similar to BMW's I-Drive or Audi's MMI) for menu selection, located in the lower screen/control surface portion of the RTD and protruding there from. This allows the projector system of the RTD to vary the labeling of the knob positions, such as those show, where the functions labeled HVAC, NAV, COMM and AUDIO are in this case selected with the joystick knob 880 or equivalent device in this mode of operation. Then, in a sub menu sense, the boxed labels can be something else in the future if desired, or these basic functions can always stay the same (like hot buttons previously described) and the other controls such as switches and knob s of the RTD can change their functions).

Figure 8B:
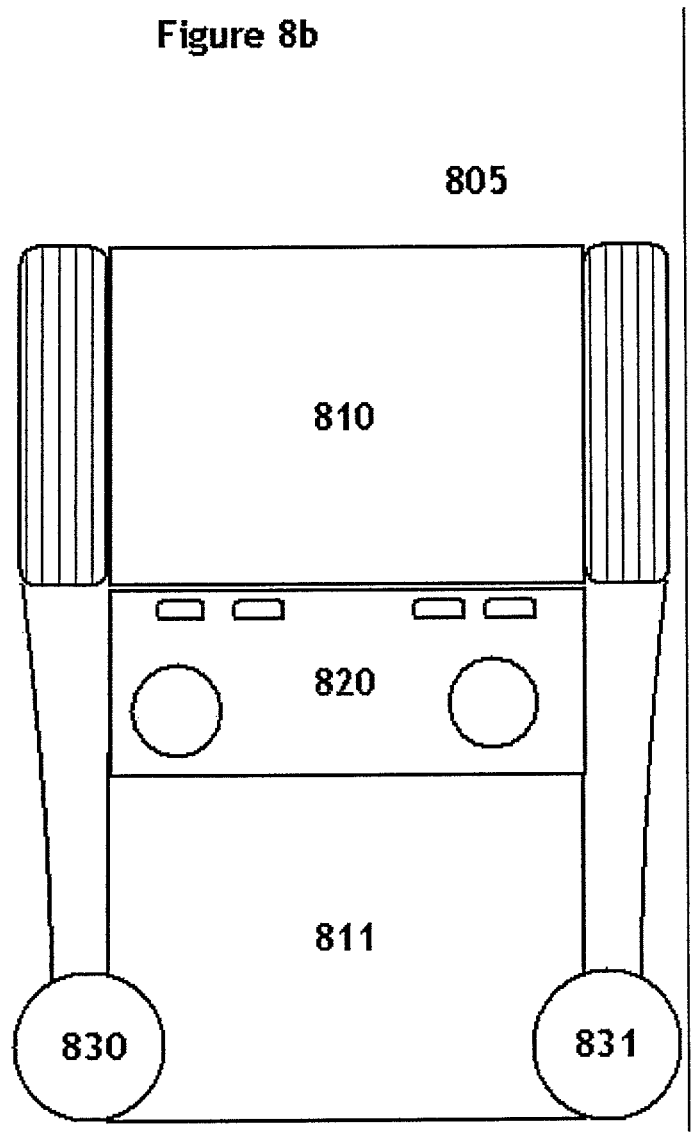
FIG. 8b illustrates a hybrid embodiment having two LCD or other Flat panel displays

FIG. 8b illustrates a hybrid layout in instrument panel center stack 805 with three displays, two LCD flat panels 810 and 811 (or other types such as OLEDs) and an RTD projection type 820 in between. One or both of the flat panels can include a touch screen function; as for that matter can the RTD. There is noted two knobs 830 and 831 at the bottom which overlap the lower LCD screen 811 in the manner shown in my July 2005 application, allowing the labeling for these knobs as well to be reconfigured by programming of the LCD 811. Images displayed on all three displays can be stitched together as described above to create a unitary rear view, map or other display when desired.

Figure 9A:
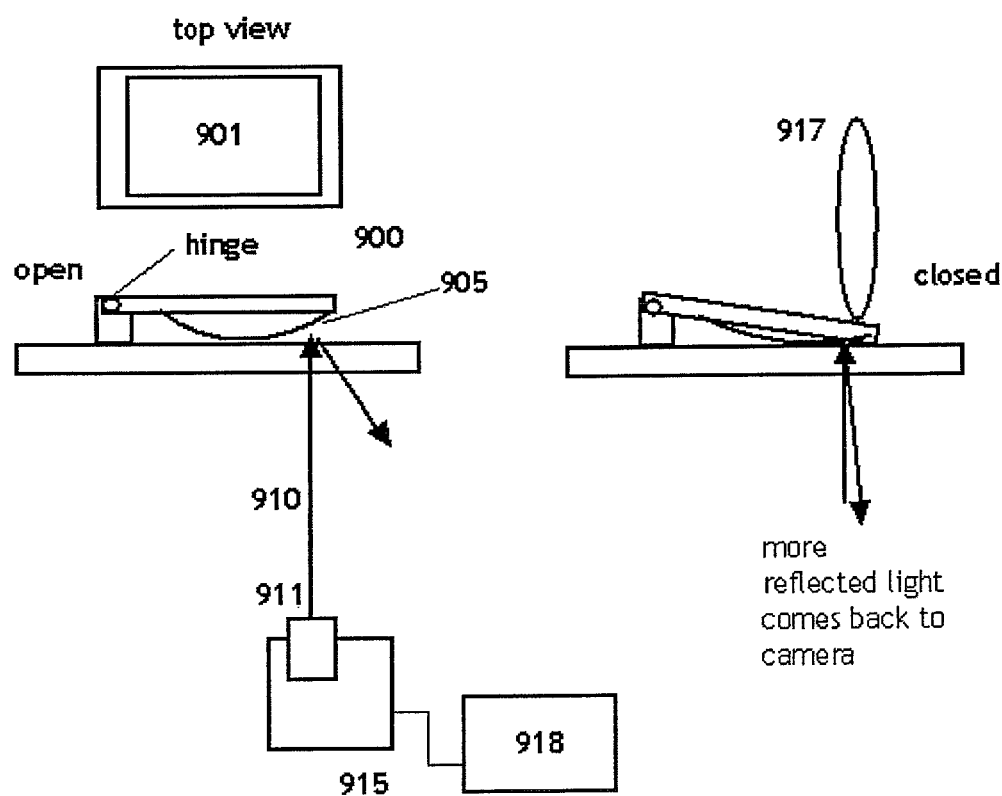
FIG. 9a illustrates a hinged reflective switch of the invention.

FIG. 9 illustrates several push switch embodiments of the invention. FIG. 9a illustrates a hinged reflective push switch 900 with a clear center 901 having a tilting action, somewhat like the rocker switch disclosed in my previous disclosures including those incorporated by reference, but with the spring member 905 providing the reflection of incident light 910 from light source 911 (such as a LED) to the camera 915, the change in which is indicative of the switch being pressed inward by the users finger 917, which changes the angle of reflection of the light. As shown when the spring is not compressed, the light is directed away from the camera by spring 905, which is interpreted as a open switch condition by computer 918. The angles of incidence and the camera axis can be chosen as desired, to either increase or decrease the amount of light reaching the camera when the switch is pressed. In the example shown the light intensity increases, as the camera is located off axis so as not to be directly in line with sunlight which might be coming thru the center of the switch, if the center is open to allow information to be projected on to a 3M Vikuiti covered plastic top member 920 and thus diffused to the user.

Illustrated in FIG. 9*b* is a cantilever beam variant, in which the switch is elastic steel member 925, forming a rectangular ring, with a diffusive plastic screen 930 fastened thereto, onto which label and other information can be projected. The elastic member may for example be a rectangular piece of spring steel, and can operate using a change in reflection from member 925 viewed by the camera as in 9*a*.

The switch can also exist as a membrane version in which the deflecting member is fastened on all sides, and deflects in the middle under finger pressure. Similarly, the variant reflection characteristics from the elastic member when pushed can be used to determine that a switch condition has been met.

Figure 9C:
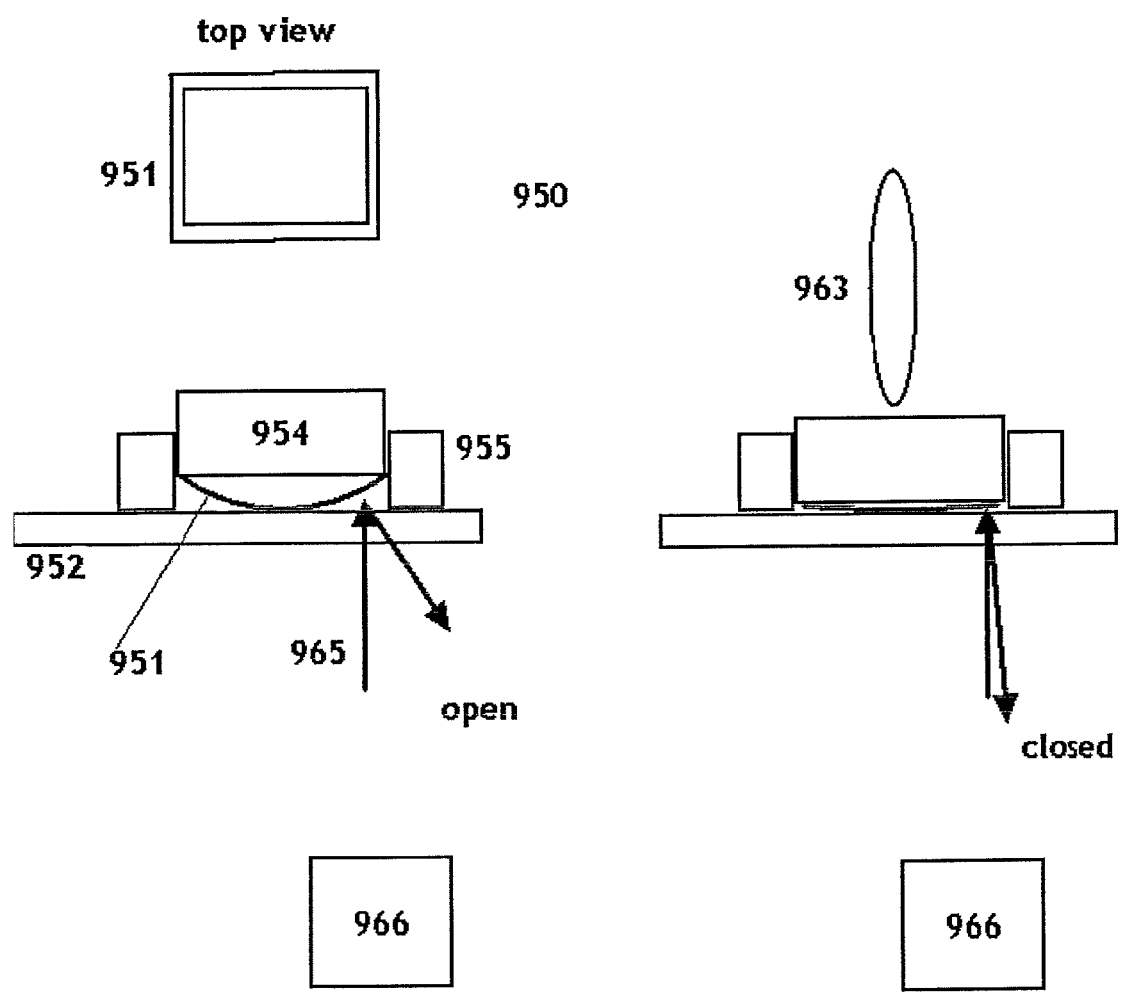
FIG. 9c illustrates a pushbutton switch with a hollow center leaf spring

FIG. 9*c* illustrates a pushbutton switch 950 mounted to screen and control surface 952 with a square leaf spring (concentric rectangular, in planar view) 951 to allow light to pass thru its center when projected, so as to indicate the switch function label or other information. This is similar to a previous disclosure, but with the outer portions such as shown illuminated by light 965 flattened out (rather than the inner portion flattened) upon pressing with finger 963 on hollow member 954 within housing 955, in this case sending more light to the camera 966 which is collocated with the light source used to illuminate the spring, indicative that the switch has been pressed.

FIG. 9*d* illustrates a variant of 9*c* in which a circular switch comprised of a circular cylinder 970 in an outer bore 975 is provided, which compresses a wave spring 980 when pressed by finger 982. The wave spring flattens out under pressure and thus reflects more light as shown to the camera or other electro-optical sensor used (not shown for clarity) than when it is in its wavy uncompressed state. The image before and after compression is shown as 990 and 991 respectively. The light is detected by the computer analyzing the camera out put and deriving from it a signal used to trip the switch. Either the total amount of light reaching the camera, or the change in the characteristic signature of the wave spring reflection, can be determined by computer 995 and used for this purpose. It should be noted that such a wave spring arrangement can be added to the knobs of FIG. 1 to allow them to also be used as push switches, to allow for example selection of a particular function or value to which the knob has been turned to. For example, optionally incorporated in FIG. 1*c* may be ring shaped wave spring 179 which fulfils the same function as in FIG. 9*e*

Figure 10A:
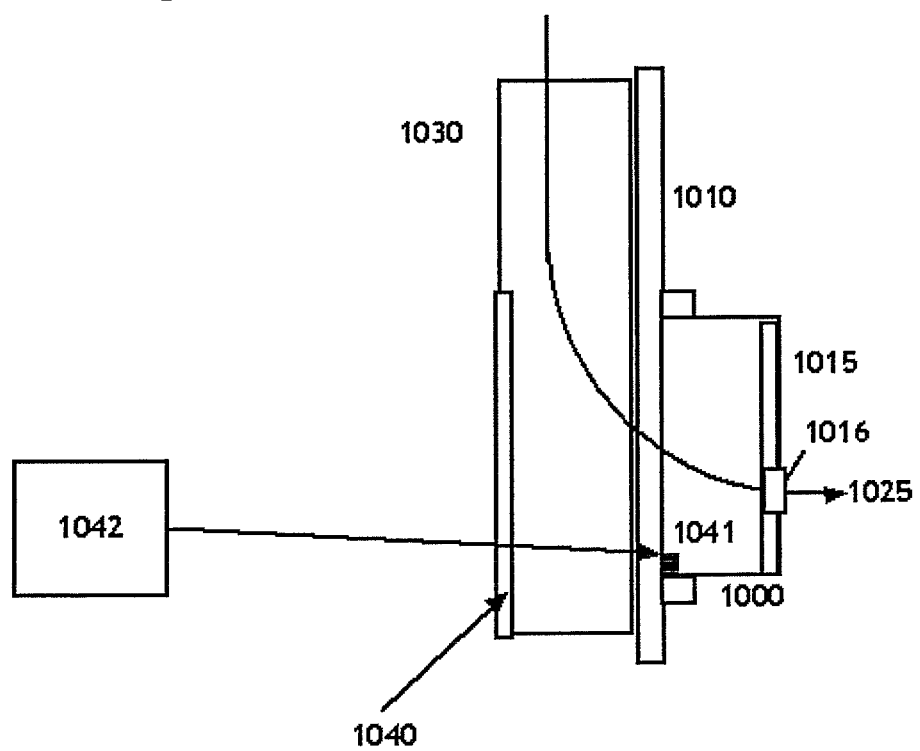
FIG. 10a illustrates the use of switches or knobs which can display data but also conduct air to passengers in a vehicle.

FIG. 10 illustrates the use of switches or knobs which can display data but also conduct air to passengers in a vehicle. I have found that it can in some cases be desirable to route vent air through switches, to allow them to act both as a vent. For example the buttons such as those shown 120-125 of FIG. 1*a*, often used to select various functions, like Audio, HVAC, Navigation, and the like, might be so used. This can also allow these switches, if desired, to be placed in a prime location at the top of the control surface without using up the space normally allocated for air vents, since the switch essentially becomes the vent. Since it is a vent, it can utilize space normally taken up by a vent. And as a switch, it can be larger than it otherwise might have been able to be, an important advantage. One can also or alternatively route air through knobs, whose size also is generally more on the order of the normal size of instrument panel air vents today. For example consider FIG. 10*a*, which shows a knob of the invention 1000 mounted on screen and control surface 1010. The knob has a front face surface 1015 on which data may be projected if desired. In this case the surface 1015 may be perforated with holes such as 1016 or other suitable orifices such that air 1025 may flow thru from a plenum 1030 behind the screen having transparent member 1040 that allows projected light to pass through to the knob face. And it allows one or more datums such as 1041 to be seen by a camera 1042 (or other electro-optical sensor) in order to determine the knob rotational position.

A front view of vent knob 1050 is shown in FIG. 10*b*, showing it mounted along with a second knob to screen and control surface 1051. The knob vents can contain baffles such as 1060 or other means of directing air if desired. The outer ring 1055 of the knob rotates is tracked with the camera of the invention in order to determine control input desired. The inner portion acts as a normal vent, and it too can independently rotate if desired. And it can be transparent with a diffusive screen to allow projection on its surface if desired. The second type of knob shown, 1070, has the inner section 1072 rotating as a knob, with the outer section 1075 acting as the vent. In either case the use of targets such as 1041 which can be seen through clear plastic of a plenum such as 1040 allows one to easily construct the apparatus. And it allows projection of images through the plenum to the knob surface (and even the vent grille surface, if diffusive and transparent) if desired.

It is desirable to make the system as versatile as possible to allow stylists freedom of expression in designing an RTD screen and control surface. This can allow combinations of shapes such as convex and concave, plus angled flat surfaces, hollowed out areas and the like. One issue is to keep the projector focused to the degree necessary for information comprehension at the different portions of this surface. This focus issue is not treated here, but some information can be found in my co pending applications and in US patent application publication 20020039229 by Hirose, Satoru; et al. It should be noted that precise focus is not necessarily needed at all points on the surface, which can employ decorations or large letters which mitigate the need for such precision.

The other issue regarding projection on stylized surfaces is to make the projected information readable and pleasing to the driver or other reader.

Figure 11:
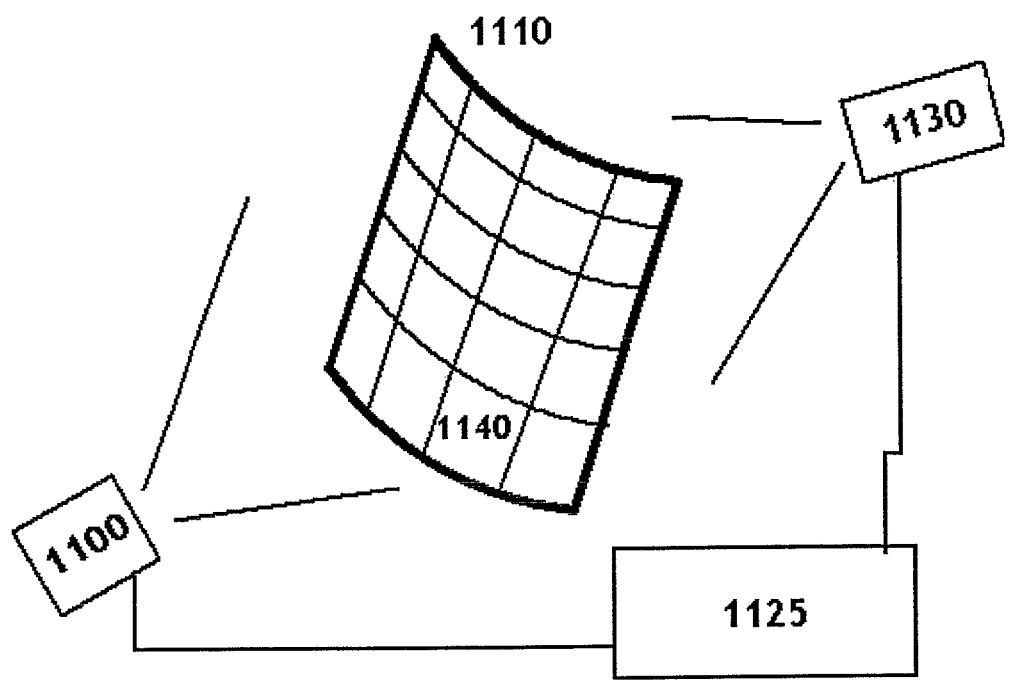
FIG. 11 illustrates a method for adjusting graphical displays on curved screens/control surfaces of the invention.

FIG. 11 illustrates a method for correcting the images projected on arbitrary screen shapes such as those often designed by stylists. This uses a camera 1100 observing the screen and control surface 1110 on which information is to be projected. In this setup case, an image of known dimensions 1120 is projected on the screen such as a grid image of crossed lines on 1 inch centers fed by computer 1125 to the projector 1130. The camera observes the resultant projected grid 1140, which has been distorted by the shape of surface 1110 (which is roughly cylindrical as shown) and outputs a signal containing the observed coordinates to computer 1125, which then compares grid 1120 to the resultant grid 1140 in order to determine the effect of the distortion as seen from the vantage point of the camera, which may be chosen for example to be the vantage point of the driver of a vehicle. Subsequent images projected may then be corrected as desired using the data obtained. In many cases, it is not necessary to correct images if the resultant image is still pleasing even in its distorted shape. For example, rear view camera images, or map images, even if distorted, may still carry meaningful control data and other information to the viewer, whose eye and brain can account for the distortion added by curvatures and irregularities in the projection surface.

The projected image can also be corrected without use of the camera if the CAD model of the projection surface 1110 is known, as the distortion can be calculated for different viewpoints. It should be noted that choice of what to project in what area is available to the designer as well. For example, it is generally not desirable to project a label of a control across a region of a sharp change in slope of the surface.

The large display in the Center stack of the vehicle, which is enabled by the invention, allows many applications to become practical. For example, data from a drive thru restaurant menu may be telematically provided to the screen of the vehicle, and data entered on the menu that is fed back to the restaurant to allow food preparation to begin at a more appropriate time. This illustrates the considerable benefit of a very large display as provided by the invention, since the menu and its selection can be made in the car itself by all the persons in the car who are able to clearly see the items on the menu, and transmitted by wireless to the restaurant (see also U.S. Pat. No. 6,574,603 by Dickson, et al). A conventional way to operate this is to provide a touch screen function in the area above the radio knobs of FIG. 1, which can be used to display the menu choice icons, and select them by touching the appropriate icon, transmitting this data to the restaurant.

Alternatively, the physical controls may be used to operate the menu choices rather than a touch screen, though the invention can be used in a touch capacity in addition. For example, the radio knob controls for VOLUME and TUNE, when the system is used for menu ordering are changed to read vertical and horizontal, which allow the knobs to be used to scroll through a displayed menu on the screen of the invention and pick the item desired which may be designated by, for example, pressing in one of the radio buttons which now in this mode may have displayed data for the menu ordering purpose.

One can in a simpler case, just use one of the knobs, for example the usual Volume knob, to scroll thru a sequence of displayed menu pictures, for example a big Mac, a Big Mac Combo, etc. When you see the one you want, you select by pushing the knob in (as disclosed elsewhere herein and in copending applications) or with one of what were the radio switches. The radio switches for example could also change, for example a switch could be for the sandwich by itself with a label SANDWITCH ONLY (E.g. a Big Mac) where the switch could have its face labeled COMBO. In this way the choices to be scrolled through and displayed would only be the images (or alphanumeric) of sandwiches one can order, with combos and drinks taken care of by switch controls. For example, when you might press another switch, which was labeled in this mode, and this would change all the sandwiches displayed, to drinks. Which could then be scrolled thru with the knob. Alternatively, you could just use the right knob (which was the radio tuner) and scroll thru images of drinks, which might be co-displayed along the right side of the screen, say.

A major advantage of the invention for this purpose is its very large display, which enables over/under, or side-by-side presentation of such menu information with regular vehicle control data if needed (for example, when the vehicle is not stopped, but rather approaching the restaurant).

Figure 12:
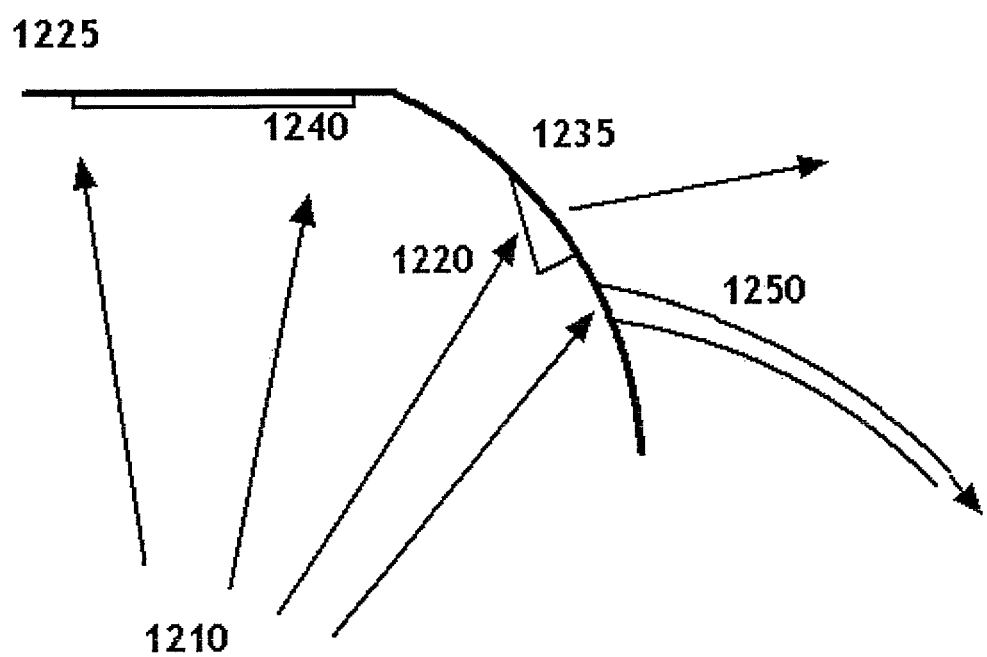
FIG. 12 illustrates using projector of an RTD screen/control surface display as a light source for the interior of the car

FIG. 12 illustrates using projector of the display as a light source for the interior of the car. The projector can programmably or fixedly project a substantial amount of light, in different colors, and to different zones of the control and display surface. This ability can be used for simple lighting functions at night, to provide white or colored ambient light in the vehicle interior, in amounts, which can be varied in color, intensity and location on the screen under computer program control.

A particular example is here illustrated, in which a portion of the projected image 1210 is directed for example to a particular region 1220 of the screen 1225 which region might ordinarily would not be illuminated. A portion of this nature might typically be on the side regions of the center stack of a car instrument panel for example. If desired Light might exit this region for example, by going through woven fabric or other decorative type material rather than high grade dispersive screen material. In the particular shown in FIG. 11, light from the side region 1220 is projected on command toward refractive element 1235 where it is directed out of the screen and into the passenger compartment as a sort of "beam" toward a region in which a user might have a map or other object, which needs illumination. Alternatively some dispersion in the element 1235 can be incorporated if a softer wider beam is needed. Multiple locations on the screen can be so provided, any or all accessible programmably via the computer controlled projector of the invention. One can even open up a section of the screen such as 1240 to allow light to come directly out without undergoing dispersion, which light may be projected onto another surface within the vehicle (or other location) for example.

Light pipes or Fiber optics, either rigid or flexible, can be used such as fiber bundle 1250 shown if desired to convey light from a region of the screen to a more remote location which can be anywhere in the interior desired. This allows the creation of programmable lighting in a wide variety of regions, at no real extra cost, other than the fibers. The main display can be turned off, or down in intensity when programmable lighting is used, or left on.

Figure 13:
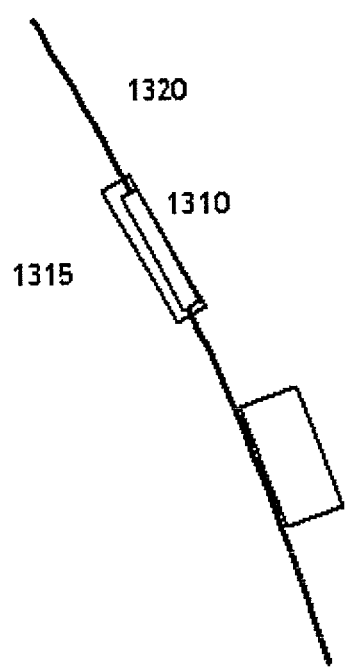
FIG. 13 illustrates use of a conventional technology touch sensitive screen overlay set into the screen of a projector based embodiment of the invention

FIG. 13 illustrates use of a conventional touch sensitive screen overlay, such as a resistive touch screen of conventional type for example available from 3M Micro touch division, 1310 may be set into a recess 1315 of the control surface and screen of the invention 1320. In particular a relatively narrow (in the vertical direction) strip type touch screen of conventional resistive or other type is shown, which is low in cost. In this case the touch screen serves to provide virtual function capability to augment the reconfigurable physical controls of the invention. Use of a conventional type of touch screen, is an alternative to use of the machine vision sensing capability of preferred embodiments of the invention to see touch locations It should be noted that the ability to recess the touch screen overlay into the main screen and control surface facing the driver as just described, is a major advantage of the invention, as it is aesthetically pleasing. This is not only due to the ability to have the touch portion flush with the rest of the surface, but also due to the ability of the invention to project no light (or some other desired light condition) around where the edges of the screen are located. And the color of the projected light can be aesthetically chosen to match a desired effect on the screen, or on the rest of the control surface.

A problem in practicing vision touch location sensing systems of my invention has been direct sunlight on the screen, which causes anomalies in certain cases and generally requires much more involved vision algorithms to sort out. In this embodiment I wish to show two aspects of a mechanical solution to the problem, which eliminate the impact of the sun by mechanical design of the screen and accessories for it.

In the first case one can design the screen to have the touch-sensing region located to be out of the sun impact region, which is by far the most troublesome in the region under the windshield of the vehicle. Cars with open sunroofs and convertibles are a special case, not treated here.

It should be noted that in a similar manner, a complete conventional display for example and LCD type or OLED type FPD can be set into the screen and control surface of a projector based embodiment of the invention. This inserted display can typically be a strip type display useful for locally augmenting the display resolution for fine graphical images for example.

Figure 14:
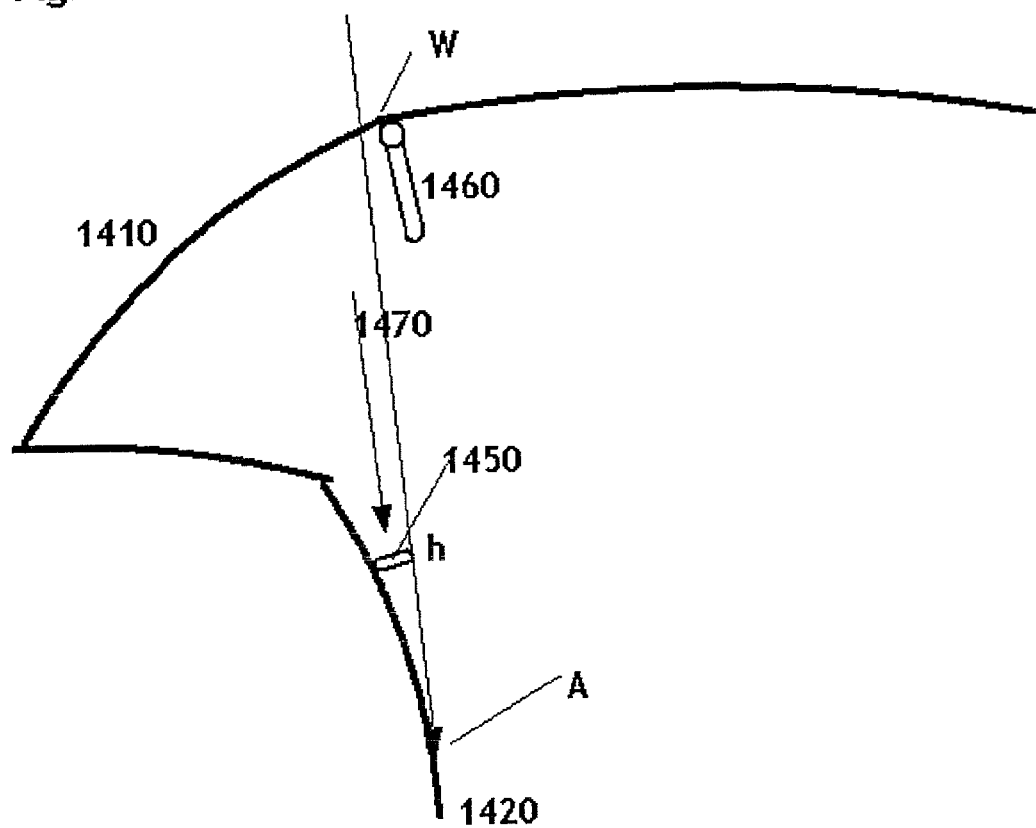
FIG. 14, illustrates a strip type vision based touch region, optionally including a sun blocking trim strip which may popped out pulled out or otherwise put in place when needed. This figure also illustrates an optional sunshade for the center stack attached to the vehicle roof

As shown in FIG. 14, the geometry of the windshield location (especially rearward point w) and the screen location and curvature is selected to obviate the effects caused by direct sun through windshield 1410 into the screen/control surface 1420 at the region of touch sensing "A". As shown, points on the screen from "A" downward cannot be substantially impacted by sun thru the windshield.

A second method, which may be used in conjunction with the above if desired, is to locate a trim strip such as 1450 on the surface of the screen 1451. This strip is both aesthetic and serves to stick up a distance "h" in height off the screen so as to block a significant portion of the suns rays through the windshield 1460 as shown, which would ordinarily hit the control surface 1420. A relatively small value of h, given the geometry shown, serves the purpose, blocking direct sun all the way to point "A" as shown. This allows an expanded region on the center stack to be used without sun effects for vision touch sensing, and further provides added ability of the driver to see the projected image on the screen in the presence of direct sun, a historic visibility problem. This trim device can be spring loaded if desired to stick up more when needed, and can be pushed back down when not needed (which is most of the time). When pushed down, it can be flush with the surface of the screen or sticking up a bit as desired. It can even be electrically motorized.

FIG. 14 also illustrates an optional sunshade 1460 for the center stack attached to the vehicle roof 1465. When swung over against the windshield it blocks direct suns rays 1470 from coming in the top of the windshield and hitting the center stack screen.

Figure 15:
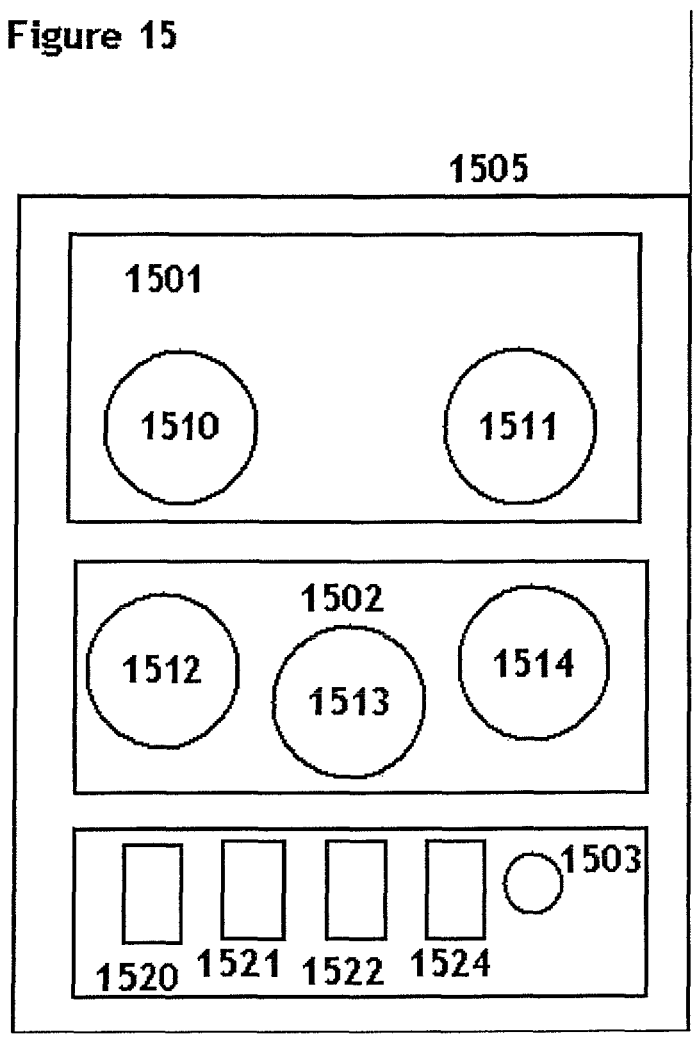
FIG. 15 illustrates an open architecture version of the instrument panel in which the user may change the meaning of various controls.

FIG. 15 illustrates an open architecture version of the instrument panel in which the user may change the meaning of various controls.

Hereto fore I have primarily disclosed a RTD invention as one in which the function of a portion of a center stack can change, from a radio, to a heater, say, in order to conserve space in the center stack and thus provide numerous advantages such as larger controls or larger labels for the controls, or more display area for images, maps and traffic information. It is however also possible to provide a standard control surface and screen arrangement in which the user can reconfigure how they want their layout to be and use the reconfigurable labeling of the invention to provide this function for them, even if the functions remain unchanged. For example, shown in FIG. 15 is a center stack 1500 having a typical layout of a low to midline vehicle today (one not having a flat panel display for navigation or rear view), however implemented in this case with my RTD invention. It typically has three sections, an Audio section 1501, a Climate control section 1502, and an auxiliary switch and control section 1503. A screen and control surface 1505 having these sections has in basic vehicles 5 knobs 1510-1514 typical of radio and heater sections today. Also shown are 4 reconfigurable switches 1520-1523. Other switches or knobs that might be provided as desired are not shown for clarity. One user might have the typical arrangement where control 1510 was Volume, 1511 was Tuning, 1512 was Fan Speed, 1513 was Temperature, and 1514 was Air Distribution, while another user might chose to label them for example where 1510 was Temperature, 1511 was Volume, 1513 was Air distribution, 1512 was Fan Speed, and 1514 Tuning. The device would be able to function the same in either case as it is all computer programmable as to function and labeling, but the choice of what control causes which function can in this case be user chosen, as could the colors or other styles of markings (labels, graphics, etc) used for the controls.

It should be noted that as disclosed previously in co-pending applications different control surfaces in shape and style, as well as controls could also be provided to users, and interchanged with those shown.

Figure 16:
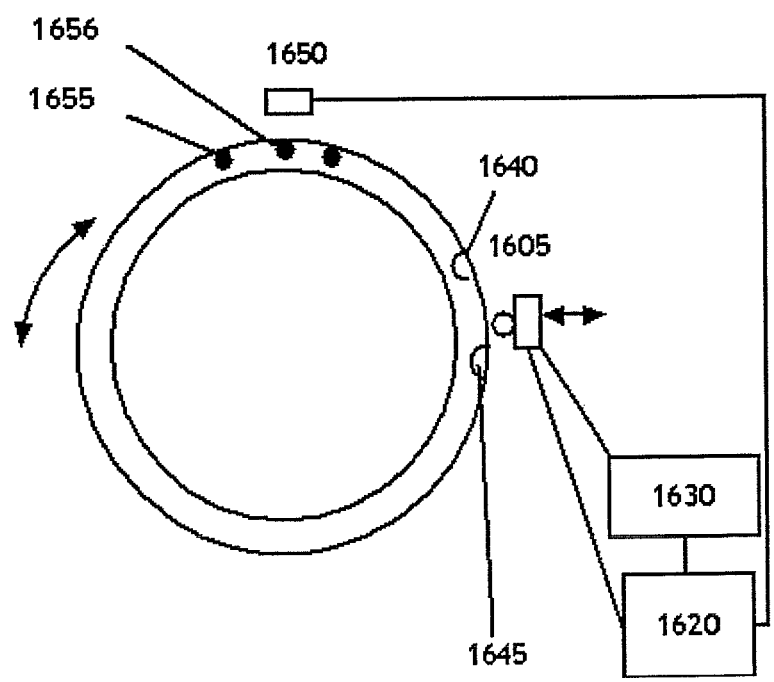
FIG. 16 illustrates a knob having a piezo-electrically actuated programmable detent or alternatively or in addition a magnetic detent capability

FIG. 16 illustrates a piezo-electrically actuated programmable detent, for a knob or slider or other physical control. This detent works on the outside ring of the knob, in one example, as to leave the center free for information display. It could also work on the inside.

FIG. 16 illustrates a piezo electrically actuated programmable detent 1605 for a knob 1610 (or slider or other physical control), which for example can be used to cause a position of a knob such as 1610 to be tactilely differentiated under control of computer 1620. This can alternatively or in addition have a magnetic detent capability as will be disclosed.

Consider a piezoelectric stack 1605, which moves under voltage applied from power supply 1630 under control of computer 1620 in order to press against the outside circumference of the knob 1640 (or in other embodiments it could be on an inner diameter thereof). When desired to make an increased resistance to rotational movement of the knob, the stack is actuated which applies a braking force to the knob outer diameter 1640. This creates, if done over a limited time, a feel like a physical mechanical detent, which is commonly used in control knobs. This force works on the outside ring of the knob, so as to leave the center free for information display but could act on the inside diameter or another way if desired. Alternatively, a piezoelectric bimorph or solenoid or other computer-controlled mechanism may be used.

As also shown in FIG. 16, there optionally can be detent pockets such as 1640 or 1645 around the ring of the knob, and the programmable piezo-electric device can be actuated to fall into all detents, or to fall into every other one, or what ever plan is desired, this makes different feels for the user, based on for example the function selected for the knob. For example a radio tuner function might have every detent felt, but a fan speed function (when the tuner is changed to a fan control) would only have every third detent engaged for example.

It is also possible to use an electro magnet 1650 on the periphery of the knob, which when energized causes an attraction force and hesitation in the knob as it comes past the magnet, due to the presence of metallic members such as 1655 and 1656 in the periphery (or other portion near the magnet) of the knob.

Figure 17:
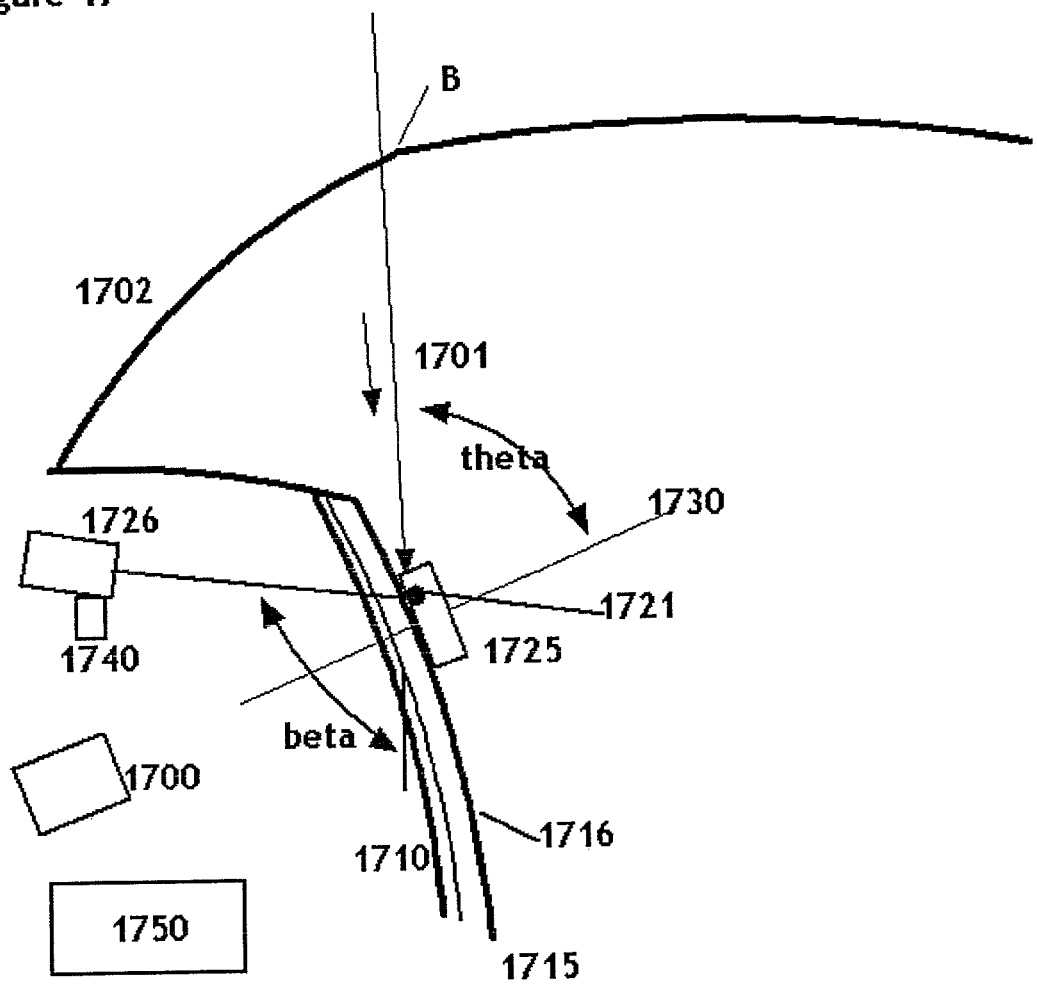
FIG. 17 illustrates a useful embodiment of the invention in a vehicle, in which camera location is selected to be out of the path of sunlight directly incident on a Vikuiti beaded black screen.

FIG. 17 illustrates a useful embodiment of the invention in a vehicle, in which camera location is preferably selected to be out of the path of sunlight directly incident on a screen having black 3M Vikuiti beaded material on its rear face. The following arrangement is good from the point of view of allowing the driver to see the projection of images from projector 1700 in the presence of strong sunlight 1701 coming through the windshield 1702 or other window. It is useful to use a material like 3M Vikuiti beaded rear projection film 1710 to absorb the sunlight hitting the screen and control surface 1715. An antireflection coating on the front surface of the screen 1716 is useful to attenuate the direct reflection from the front surface in the relatively infrequent case that the driver's eyes are at the reflectance angle.

When arranging the system in this manner i have found it useful to have the camera 1720 viewing datums such as reflector 1721 knobs, switches, or sliders which may be mounted to the on the screen/control surface (such as switch

1725 shown) at an angle theta to the average screen normal 1730 as shown, which makes a significant included angle beta with the usual sun direction through the screen. In this case, the camera 1726 does not see the vast majority of sunlight passing through the vikuity film, as this beaded film substantially cannot diverge it in the camera direction. Even angles beta of 30 degrees are helpful to keep overloaded light levels from reaching the camera, causing difficulties in some cases.

The problem in this arrangement is that it also makes it difficult for light projected by LED light source 1740 located near the camera axis, or for the projector light to reflect back to the camera through the Vikuiti film from a finger touch on the screen, so as to allow the camera image processed by computer 1750 to serve as a determiner of finger touch location. In many cases however, I feel that such finger touch detection may not be necessary and that the use of the camera in sensing reflectors or other datums on physical controls such as knobs switches and sliders allows their use in a manner that provides all the reconfiguration necessary for the average driver. It is useful that retroreflector type targets may be used which have very high contrast when using light projected along the camera axis.

Figure 18:
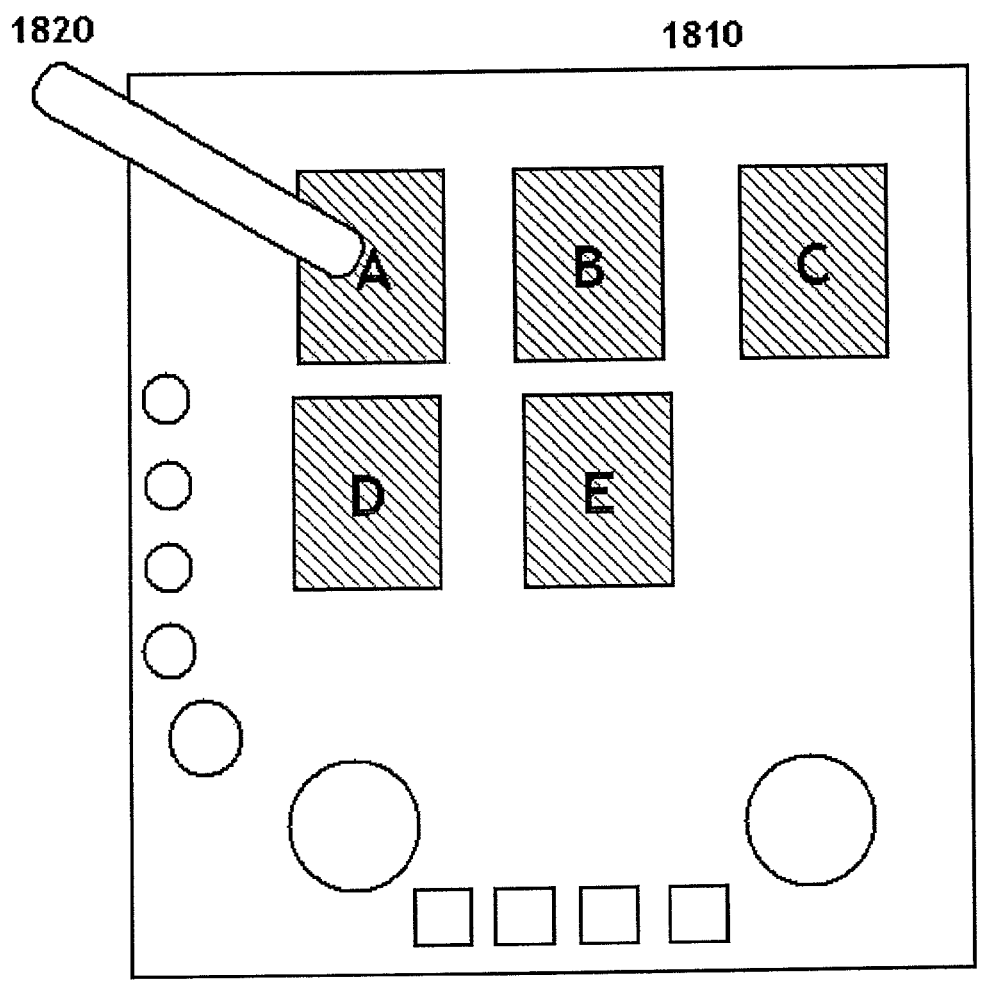
FIG. 18 illustrates a designation application of the invention, in this case for phone dialing or response.

FIG. 18 illustrates a designation application of the invention, based on the FIG. 1a control surface and as disclosed in co pending applications. In this case images such as A-E displayed on a touch-sensing portion of screen/control surface 1810 to be designated are that of a person, whose picture is stored in memory and placed on the display in order to be designated in order to phone the person. Or the image may be transmitted from a person phoning the user, to the vehicle and be displayed in order to indicate who is phoning. This may be more rapidly recognized (and thus safer) than either trying to say the data visa a text to voice program, or to display text itself. When one sees the image desired, one just touches the image with finger 1820 and the touch sensing incorporated as part of the vision system of the invention, or with a separate conventional touch overlay on the screen, picks up this signal and for example, calls the person, or answers their call using hands free capability of the vehicle audio system. Other actions can be taken as well, such as storing the data of their message in memory, or recalling them at a later time or whatever.

The Pictures A-E as shown are of six persons one wishes to call, though it is realized that more or less could be displayed. The driver, to call the person, just touches their picture, and the touch location and appropriate person is recognized and the call automatically may be placed using stored dial up information. In another scenario, an incoming call can display the person's picture, which can be quite large and easy to see given the amount of display space available. It can even be done while the gage or other information is displayed as well A major advantage of my RTD invention, as has been pointed out previously is that it provides, in the confined space of the center stack region of the instrument panel, an intuitive reconfigurable interface allowing numerous functions of a vehicle to be displayed and controlled in an easily understood and easy to work manner. This is desirable for reasons of clarity, or tactile feel, and is also desirable in that it allows numerous functions to be coalesced into the center stack, eliminating cost in other portions of the interior.

The general subject is called de-contenting, that is removing the cost of switches, displays, wiring and other related electrical, mechanical, and design costs associated with them. This is no small advantage. Assuming that the user is happy with having everything on the center stack, and reconfigurable such that for example seat functions only appear when needed, the vehicle can save the costs of the following components in all aspects (component, assembly, wiring, design, recess in other components, inventory over 10 year mandated period, etc): Seat adjustment switches, (4 or more directions, typically 1 or two used); Window lift switches (2 directions, typically 4 used); Mirror adjust switches 4 directions; Overhead console switches and displays such as compass or lights (particularly SUVs and minivans); 4 wheel drive related controls; and others as applicable. To the above one can add the critical switches and controls that may need backup separately such as headlights, other lights and wipers.

One can provide the switches and other controls needed in a manner that uses the computer of the system to memorize data and in addition provide a suitable display of the actions, which may be performed, or are being performed through action of the device. This allows one to have memory seat and mirror functions for example, for a number of drivers. And the display of the locations memorized can make understanding thereof helpful. In addition one can display images taken by the mirror locations if there are TV cameras looking down the mirror axes. Displays of unusual seat functions such as vibration, cooling, lumbar and other supports can also be provided on the screen of the invention, with signals derived from the control function enabled. Associated controls can be done nicely with a touch function for example, touching a seat diagram at the lumbar points desired to be moved.

For example, let us consider a bank of 4 switches in which 2 are responsive in two axes, and 2 are in one axis. These reconfigurable switches with data projected on their face or next to them can be used to control seats, mirrors, window lifts and a variety of other functions. We can also provide in a more simplified system, the control of the device directly such as disclosed in my January 2005 application. And we can do both, have some motor currents controlled directly from devices on the screen, and some controlled by the computer reading the control positions, and acting through the I/O of the computer system.

Another de-contenting aspect is to replace what is called the instrument cluster, typically containing the speedometer and other gages which in most vehicles is now directly ahead of the driver behind the steering wheel. The large display area made possible by the RTD makes this possible, and the Inset version of the hybrid invention above of FIG. 1 even allows the gages of the cluster to be on the display 700 inset by a distance D and more in focus to the driver if he is focused on objects in front of the vehicle.

One can also operate the invention in concert with a cluster display of gage data whether separate in front of the driver, or on the RTD itself. If the cluster display in front of a driver is also programmable, for example using an LCD display in the cluster then the information in the center stack can be exchanged with the information in the cluster, and various advantageous combinations provided to the driver. For example take the case where the pictures of persons to call or answer occupies on the center stack screen, the location where the tachometer, fuel and charge gages were previously displayed. In this case, one or all of these instruments can be directed by computer to be displayed in the cluster in front of the driver for example. For example, in this situation only the fuel gage and charge indicator might be displayed, as it is considered unlikely that tachometer information would be needed while answering phone calls. It is noted that when displayed on the cluster in front of the driver that generally has less room, the physical size of the displays may be reduced, and/or their information content reduced. For example, a fuel gage under such circumstances just might show a needle, and F and E (for full and empty) where as in the center stack with more space available, the fuel gage could show graduations of fuel, and also trip computer like data, such as miles to empty or the like.

Figure 19:
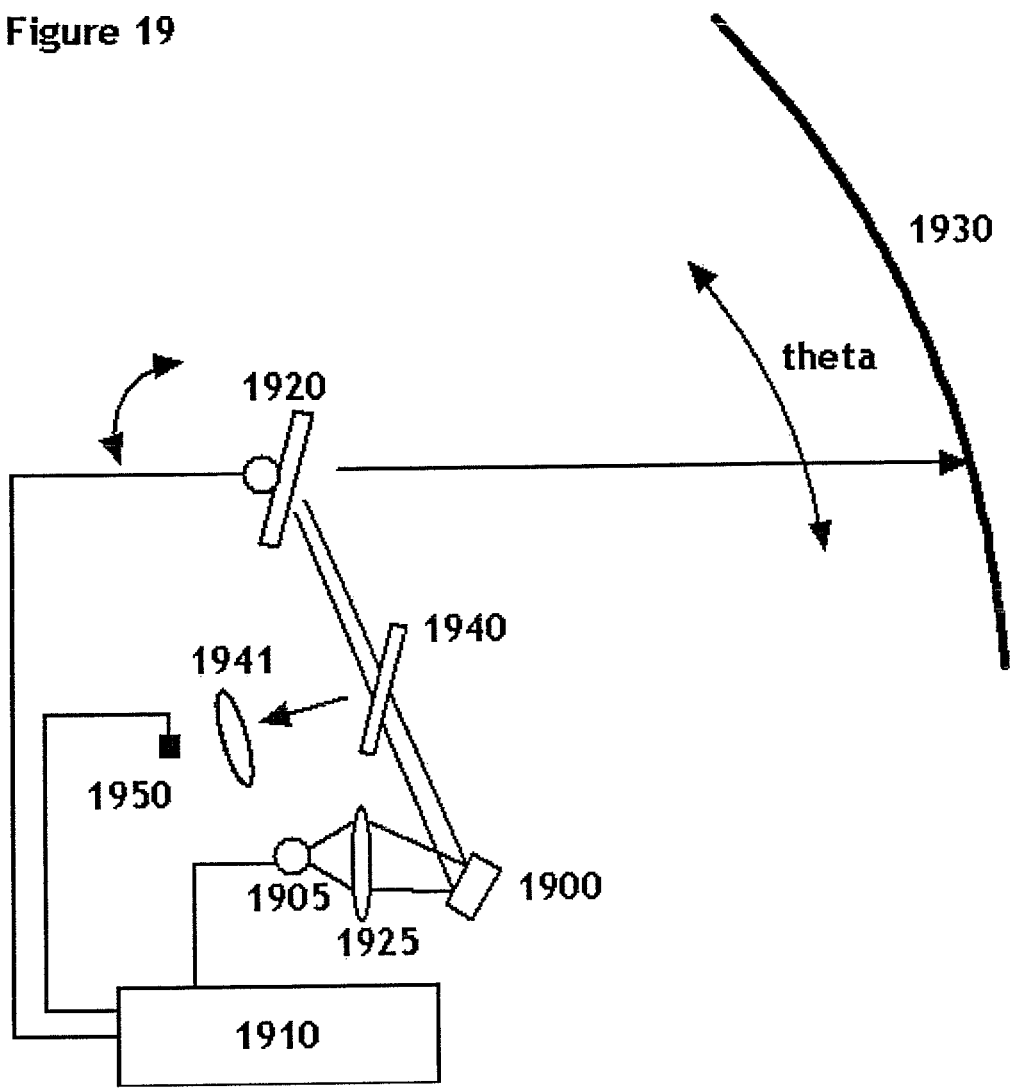
FIG. 19 illustrates means for projection and imaging of data using a line scan light valve and rotary mirror, coupled with a line scan detector array.

Now illustrated is another type of combined projection and sensing arrangements. As shown in FIG. 19 a line scan light valve 1900, having pixels oriented in the direction out of the plane of the drawing, such as a line type micro-mirror chip (DLP or other) is illuminated by line light source 1905 which can be an RGB group of diode lasers for example. Both the light source and the DLP are controlled by computer 1910, which also controls oscillating or rotating mirror 1920 used to scan the line image produced by lens 1925 sequentially across screen and control surface 1930 in the theta direction shown. By virtue of the beamsplitter 1940 and lens 1941, this same rotating mirror also scans the field of view of a line scan detector array 1950 (such as a Reticon or Dalsa brand 256 or 512 element photodiode array) which is also controlled by computer 1910. The array images the line zone projected or may image another zone ahead or behind it. This is particularly feasible when a separate IR line light source such as a diode laser operating at 880 nm is included in the source group 1905 and controlled by computer 1910 to act in concert with the scanning of array 1950. Where a IR laser or LED source is used, the array may include a interference or other type filter to pass effectively only radiation at the IR wavelength used.

It should be noted that one can scan a small number of pixels such as 256 in the array at a high scan rate, such as 40,000 scans per second or more. This allows one to easily filter the output of the array to reject ambient light such as sun light, as well as certain frequencies present in some artificial lights. In this case the IR source used for example, may also be modulated to project light also in concert with the array, such that when the array was integrating charge between scans, the light was on. This maximizes the light output. If 40 khz was the scan rate used, one can use a video filter rejecting frequencies less than 40 khz as well as filtering out higher frequencies due to individual detector spikes would not be analyzed by the computer to determine the presence of touch or control position on control surface 1920. And all this can be done while providing the projection display.

Alternatively, one might chose to scan the array only after each of the Red Green And Blue fields of the projection cycle of the light valve. Had been projected. Or one might even choose only ever 3 projection cycles, if data was not needed too quickly.

A DLP or LCOS reflective light valve may be employed, and other types of light valves may alternatively be used, such as the grating light valve (GLV) made by Silicon Light Machines corp.

One can use a fixed frequency mirror scan if desired. For example the mirror could be driven by a constant speed motor or a torsional oscillator.

My RTD invention disclosed herein and in co pending applications incorporated by reference allows one to have a screen/control surface that can if desired, occupy substantially the total height of the center stack. In practicing the invention I have found that when one puts physical knobs or switches near the bottom of the control surface in the center stack, that it is generally desirable that these be larger than those controls located higher up and closer to the driver, as the ones toward the bottom are generally more difficult to see and reach. The same holds true for the lettering of labels related to them (which often is on the knob or switch itself, and thus related to its physical size). In Minivans and SUVs, where the center stack can extend downward the near the floor, this is especially important, and knobs and switches there should be at least 1.3 times those above I feel.

In addition, where physical switches are located relatively low in the center stack, it is desirable in some cases to tilt their front face upward, to make them easier to see by occupants of the vehicle and especially the driver. For example, in a switch the front face from which projected light information diverges should preferably be angled such that the bottom of the face is outward from the center stack surface by a several millimeters more than the top portion of the face.

Where virtual controls are located at the bottom reaches of the centerstack, the surface on which they are projected and acted on by touch should also if possible be angled upward toward the driver as well. This means that the screen at the bottom would angle up slightly in the region in which the virtual controls were projected. And their lettering and size should preferably be larger too than would be required at the top.

While a knob or other physical detail can be sensed electronically in a conventional manner, or may be sensed electro-optically from the side in a manner conducive to the many other advantages of the invention (particularly when employed with rear projection based screens and control surfaces in automotive center stack applications), the preferred solution is to sense physical details electro-optically from behind. This approach has several advantages:

It is compatible with curved screen/control surface and rear projection applications. While electronic knobs (and other physical details) can be added to such a screen/control surface it allows a low cost touch screen solution over a large area (very little or no added cost).

Second it is less costly if numerous physical controls are used. A single camera or other electro-optical sensor can see all the controls, and the finger touch commands as well.

Third, since it is totally non-contact, it makes interchange of front panels very easy and inexpensive. This is important to allow customization for various option packages or vehicles or even individual buyers. And it is important that it can be easily and inexpensively changed to a standard or other design, when the car is sold. And such standard designs can be easily employed by rental car companies and others with a wide range of users.

While shown flat for clarity and/or ease of drawing, it is understood that in general, the control surface/screen of the invention when using a projection type display can be curved in either plane, and that such curvature is generally stylistically desirable for automotive vehicle center stack applications.

Some of the embodiments herein may be used with OLED displays, which are thought to be a desirable future benefit. Especially since OLED displays, like rear projection ones can employ curved screens of stylistic value in vehicles. These arrangements may also be used, like those previous, with optical or other touch sensing methods, which may be additionally incorporated to make a complete instrument panel control system.

As shown in copending applications, one can have levers such as transmission levers or throttle levers (for example in a plane or boat) come through the screen/control surface, which allows one to label actual or desired positions thereof of using the projector of the invention. That figure also shows a flat screen/control surface section making an abrupt transition from a curvilinear portion The invention allows a vastly larger display than possible with conventional LCD or other flat panel center stack displays today and gives a much greater margin of safety when displaying rear view images or other vital information. Where applicable controls exist on the screen and control surface on which the display is projected portions of the total image are projected through to the face of a knob or switch (or seen through to a screen beneath).

When it is desired to project parts of images on the faces of knobs and switches or sliders, it is desirable to make as clear an optical path as possible. In some cases it can be desirable to make knobs and sliders which allow you to see through the knob to a screen beneath as opposed to putting the screen on the knob so to speak, if only because the interruption in the image due to demarcation lines appears to be less. However displays can be projected right up to the edge of knobs and switches, and thus have desirably little border with respect to them Many of the switches and knobs disclosed herein are useful in both the projector form as shown herein, and the LCD form of my co pending application filed July 2005

It is preferred that one project data on diffusing material on the switch face, and that no diffusing material be located between the face and projector or other graphics generation device. Alternatively one can look through the switch at a display beneath, for example an LCD display as disclosed in my July 2005 application, or one can have a switch face that is opaque, with relevant information printed on it, and/or displayed beside it. If only printed, the switch would not generally be reconfigurable in function.

One can teach the vision system if desired, buy simply actuating a control and recording the change in images which results, storing the changes in a lookup table. Then in practice, the table of control values with respect to image characteristics is constantly compared to actual image characteristics to determine the control values at that moment. This can be done for each control if desired.

It should be noted that rather than reflect projected light directly one can reroute light thru a switch or knob and cause it to be retransmitted back to the region of the camera so as to be seen thereby as a function of switch or knob position.

The invention accommodates many types of physical controls. While previous copending applications illustrate conventionally operable sliders of the invention, FIG. 20 illustrates a unique curvilinear slider made practical by the invention. A curvilinear track 2000 in which the slider handle 2010 slides is attached to screen and control surface 2020. The curvilinear track is totally unlike conventional sliders, and is made possible by the ability of camera 2030 to determine the location of datum 2040 on the slider in both x and y planes, and from that determine slider position. This position can be relative to graphics, which are projected on to the screen in one direction only, or in both directions, as desired. The datum target 2040 can be observed through diffusing material such as 3M Vikuiti 2050 applied to the back surface of the screen, or the diffusing material can be left off in the region of the slider movement. In this case, it is generally desirable to not project light into this region.

Figure 21:
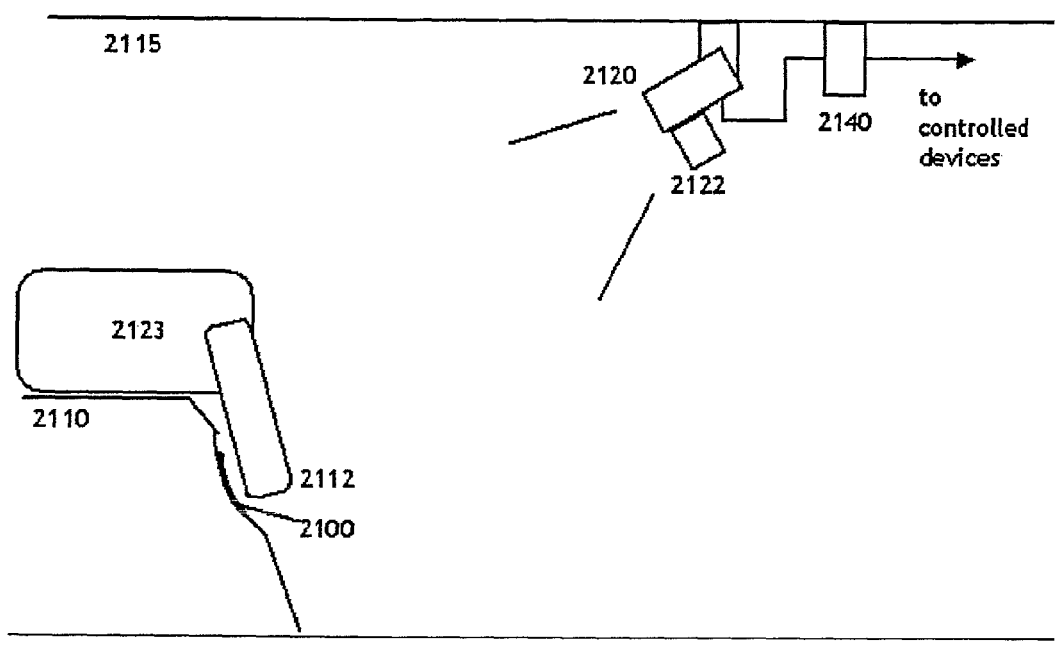
FIG. 21 illustrates a finger operated reflection based switch embodiment in the car interior or other location.

FIG. 21 illustrates a form of switch in the car interior, home or other location, where you cover, or expose, a reflector, preferably a retro-reflector with your finger (or alternatively another member) in order to change the signal to a camera located in a position to view the retro-reflector.

As shown, a retro-reflector 2100 made for example of flexible 3M Scotch light type 7615 glass beaded material is provided on a rear door armrest 2110. Such material can typically be curved to flow over contours of seats, armrests, and other interior components aiding its use in cars, homes and offices. In this example it conforms to a concave section making it easy for the user 2123 to rest his finger 2112 on it, and feel where it is, in an otherwise flat section of the armrest.

A camera 2120 and IR LED light source 2122 located in the headliner of the vehicle 2115 illuminate and view the rear seat area including the armrest 2110. When the user is sitting in the seat, and normally resting his hand on the armrest, the retro-reflector is typically uncovered in this example, and a strong signal is returned to the camera, since the LED 2122 is located near the camera axis. When the user wishes to signal the computer system 2140 connected to the camera and analyzing its signals, he just covers the retro-reflector 2100, which may be as easy as sticking his finger 2112 in front of it.

Feeling where the reflector is can be aided by for example providing tactile cues, such as a small recess or protrusion in the armrest, to act as a tactile guide for the finger. A concave portion shown also acts to shield the reflector from scrapping type damage at the same time. The computer 2140, controlling devices in the vehicle, detects the command from the absence of light in this case, caused by the finger covering the retro-reflector, which ordinarily provides a strong return signal, orders of magnitude more than the finger, and easily seen. The user can signal many things in this way, and multiple reflectors in the arm rest, or in different locations such as the seats, door panels and the like, can also be used and similarly sensed with the same camera if desired. Indeed the return signals are so strong that a single camera can sense all such input devices in the whole rear seat area within its field of view, such as might be on right and left armrests, or on seat cushions, or on child seats brought into the vehicle, should a toddler in such a seat wish to command for example a DVD player (to turn on, change films, etc) or provide a signal to his parent. Or if a camera is aimed at the parents face while driving, the toddler can for example cause that image to come up on the DVD video screen. It is noted that such retroreflective material useful in this way may also be provided on child seats, or on the clothing of occupants of the vehicle. Such material is sometimes on clothing anyway for night time visibility purposes, though generally not in the location best suited for operation as disclosed above.

It is noted that a target datum such as 305 is usually a specialized reflector, but it can be any portion of the switch (or other physical control), which can be identified relative to its surroundings as relating to switch position. Indeed multiple switch portions can be identified and averaged for improved results if desired, where the movement of the average is detected). The same holds true for knob or slider datums, with the caveat relative to knobs that one generally needs to know the angular position and make sure that it hasn't gone more than once around, or if it does, to track this motion to obtain an accurate indication of the total movement of the knob.

Figure 22:
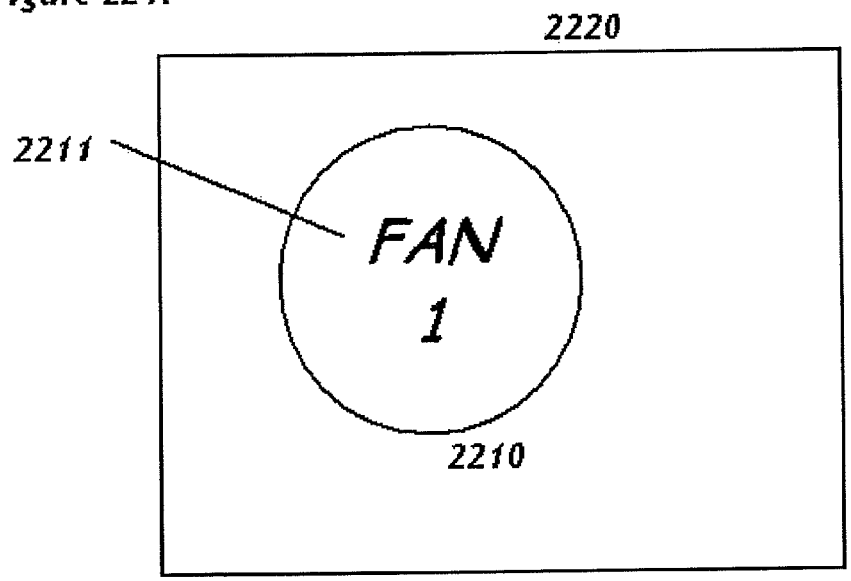
FIG. 22a illustrates a knob label arrangement of the invention
FIG. 22b illustrates another knob label arrangement
FIG. 22c illustrates a further knob label arrangement
FIG. 22d illustrates a knob label arrangement
FIG. 22e illustrates a knob label arrangement
Figure 22:
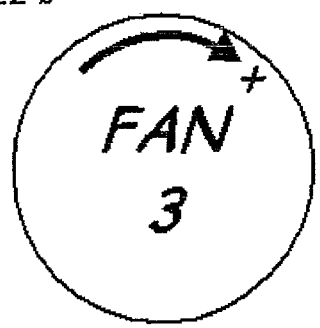
Figure 22:
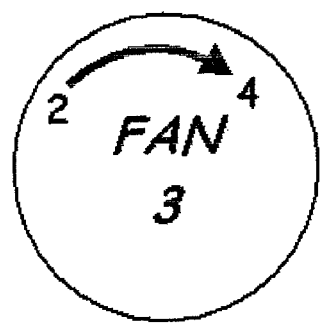
Figure 22:
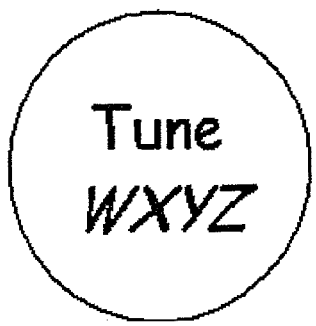
Figure 22:
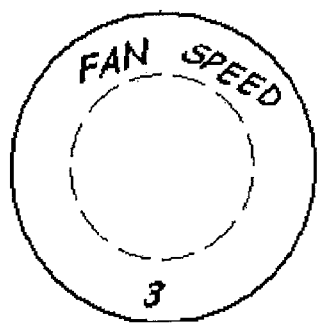

FIG. 22 illustrates examples of labeling of a knob 2210 having projection of data on its face 2211 from the rear by provision of diffusing material on the face member of the knob as taught above, rather than the screen and control surface member 2220 behind on which it is mounted. Member 2220 in this case may however, serve as a rear projection screen for data projected in areas adjacent the knob and elsewhere.

In FIG. 22, the knob shows an indication FAN SPEED 1, indicating a condition of a first low fan speed for example, as the knob is turned clockwise, the sensor sensing its position, or switching currents directly based on its position as taught above, is determined, and the projector is caused to project for example, FAN SPEED 3. It is noted that projection of data as to knob position on its face saves the space around the knob, which does not have to have fan speed data such as 1, 2, 3, 4 etc graduations projected, though they can be if desired, as can the knob location indicia such as black dot 2225. By projecting the indicia, one can reset knob location as desired in the computer driven projection display program.

As noted elsewhere, the projected data can be changed to another label (for example VOL, for radio volume when in radio mode) or even graphics, like a picture of a Fan, or even Mickey Mouse or ones house, if desired. FIG. 22b illustrates a variation wherein as one turns the knob to the right, for example, this turning motion is sensed by the camera or other knob sensor employed, and the computer causes the projector to display the direction of turn (for example in a positive or increasing fan speed direction). One might also display the number on each side of the present one as shown in FIG. 22c FIG. 22d illustrates another version, for a radio in which the projection on the tuner knob is both the function label TUNE, and the call letters of the station presently playing or next coming up.

Similarly a two-position switch for example having such a center projection surface can have data such as TRACTION CONTROL ON or TRACTION CONTROL OFF projected on its face. This saves having to have a separate light with this information, which saves both cost and space.

FIG. 22e illustrates another condition, which is useful where a center shaft such as described in FIG. 28 is employed to carry knob rotation to a sensor or control device having an outline 2250 shown in dotted lines. In this case the fan speed data above is projected in an annular region 2255 which is clear of the outline, but within the inner diameter of the knob 2260.

FMVSS 101 is contained in USA CFR Title 49 part 571. "Light" as used herein includes all electro-magnetic wavelengths from ultraviolet to near infrared The invention has been described in connection with numerous embodiments, it is to be understood that the specific mechanisms and techniques which have been described are merely illustrative of the principles of the invention, numerous modifications may be made to the methods and apparatus described without departing from the spirit and scope of the invention.

What is claimed:

1. A knob for controlling a computer based function, comprising:
    a first portion affixed to a member;
    a second portion rotatable with respect to said first portion; and
    a camera for obtaining image information concerning the rotational position of said second portion including at least one target thereon, said camera located on the opposite side of said member from a user of the control knob.

2. The knob according to claim 1 further including a light source to illuminate said at least one target.

3. The knob according to claim 2 wherein said light source comprises at least one LED.

4. The knob according to claim 1 further including a computer to analyze the output of said camera to determine a user control input.

5. The knob according to claim 1 wherein said second portion is further movable in at least one Cartesian axis with respect to said member.

6. The knob according to claim 1 wherein image information concerning a plurality of targets is obtained.

7. The knob according to claim 1 wherein said image information further concerns the position or state of at least one additional physical control.

8. A knob for controlling a computer based function, comprising:
    a first portion affixed to a member;
    a second portion rotatable with respect to said first portion and movable in at least one Cartesian axis with respect to said member; and
    a camera for obtaining image information concerning the rotational position and at least one Cartesian position of said second portion, said camera located on the opposite side of said member from a user of the control knob.

9. The knob according to claim 8 further including a computer to determine from the output of said camera a desired user control input.

10. The knob according to claim 8 further including a light source.

11. The knob according to claim 10 wherein said light source comprises at least one LED.

12. The knob according to claim 8 wherein said second portion is movable in two Cartesian axes with respect to said member.

13. The knob according to claim 8 wherein said image information further concerns the position or state of at least one additional physical control.

14. A knob for controlling a computer based function, comprising:
    a first portion affixed to a member;
    a second portion rotatable with respect to said first portion;
    a light source; and
    a camera for obtaining image information concerning the rotational position of said second portion, said camera and said light source located on the opposite side of said member from a user of the control knob.

15. The knob according to claim 14 further including a light source.

16. The knob according to claim 15 wherein said light source comprises at least one LED.

17. The knob according to claim 14 further including a computer to determine from the output of said camera a desired user control input.

18. The knob according to claim 14 wherein said second portion is movable in at least one Cartesian axis.

19. The knob according to claim 14 wherein said image information further concerns the position or state of at least one additional physical control.

20. The knob according to claim 14 wherein said image further concerns information relating to a selection by a user.

* * * * *